United States Patent
Joshi et al.

(10) Patent No.: US 9,794,735 B2
(45) Date of Patent: Oct. 17, 2017

(54) CONTEXT DETERMINATION FOR MOBILE DEVICES WHEN ACCESSING REMOTE RESOURCES

(75) Inventors: Amit Mohan Joshi, Sunnyvale, CA (US); Nils Bunger, Stanford, CA (US); Sanjeev Radhakrishnan, San Jose, CA (US)

(73) Assignee: DROPBOX INC., San Francisco, CA (US)

( * ) Notice: Subject to any disclaimer, the term of this patent is extended or adjusted under 35 U.S.C. 154(b) by 0 days.

(21) Appl. No.: 13/397,456

(22) Filed: Feb. 15, 2012

(65) Prior Publication Data

US 2013/0212486 A1    Aug. 15, 2013

(51) Int. Cl.
| | |
|---|---|
| *G06F 3/048* | (2013.01) |
| *H04W 4/02* | (2009.01) |
| *H04L 29/08* | (2006.01) |
| *G06F 9/50* | (2006.01) |

(52) U.S. Cl.
CPC ............. *H04W 4/02* (2013.01); *G06F 9/5011* (2013.01); *H04L 67/1002* (2013.01)

(58) Field of Classification Search
CPC ............... H04L 12/5695; H04L 47/824; H04L 12/2692; H04W 72/04; H04W 64/00; G06F 21/35; G06F 17/30902; G06F 9/5061
USPC ................ 715/744, 810, 738, 740; 707/741; 455/456.1; 709/204
See application file for complete search history.

(56) References Cited

U.S. PATENT DOCUMENTS

| | | | |
|---|---|---|---|
| 6,538,667 | B1 | 3/2003 | Duursma et al. |
| 2008/0229210 | A1 | 9/2008 | Bamba |
| 2009/0113346 | A1* | 4/2009 | Wickramasuriya et al. . 715/825 |
| 2009/0228779 | A1* | 9/2009 | Williamson .............. G06F 9/54 715/233 |
| 2010/0064228 | A1 | 3/2010 | Tsern |
| 2010/0269047 | A1 | 10/2010 | Pahlavan et al. |
| 2011/0119628 | A1* | 5/2011 | Carter et al. ................... 715/812 |
| 2012/0021774 | A1* | 1/2012 | Mehta et al. ............... 455/456.3 |
| 2012/0084663 | A1 | 4/2012 | Momchilov et al. |
| 2012/0095878 | A1 | 4/2012 | Feldman et al. |
| 2012/0166530 | A1* | 6/2012 | Tseng .............................. 709/204 |

(Continued)

OTHER PUBLICATIONS

"CloudOn brings you Microsoft Office(R) on the iPad", available at http://site.cloudon.com/, accessed Feb. 3, 2012, CloudOn 2011, 5 pgs.

(Continued)

*Primary Examiner* — Sang H Kim
(74) *Attorney, Agent, or Firm* — DLA Piper LLP (US)

(57) ABSTRACT

In one example, a device, such as a remote computing device or a mobile device, includes one or more processors configured to compare current values for one or more context dimensions to data indicative of relationships between accesses to resources maintained by a remote computing device and values for the one or more context dimensions during the accesses and to determine one or more of the resources maintained by the remote computing device that have a high probability of being accessed based on the comparison and a network interface configured to cause a mobile device to obtain information indicative of the determined one or more resources based on the determination that the one or more resources have the high probability of being accessed.

29 Claims, 15 Drawing Sheets

(56) References Cited

U.S. PATENT DOCUMENTS

| | | | |
|---|---|---|---|
| 2012/0233549 A1* | 9/2012 | Ricci | 715/740 |
| 2013/0007260 A1* | 1/2013 | Jain | G06F 17/30902 709/224 |
| 2013/0014040 A1* | 1/2013 | Jagannathan et al. | 715/765 |
| 2013/0127920 A1* | 5/2013 | Grinshpon et al. | 345/661 |
| 2013/0182603 A1* | 7/2013 | Twell | H04W 64/00 370/252 |
| 2013/0198363 A1* | 8/2013 | Kolluru | H04L 67/22 709/224 |

OTHER PUBLICATIONS

"CloudOn for iPad on the iTunes App Store" available at http://itunes.apple.com/us/app/cloudon/id474025452?mt=8, accessed Feb. 3, 2012, Apple Inc. 2011, 2 pgs.

Bray et al. "Extensible Markup Language (XML) 1.0 (Fifth Edition)", W3C Recommendation, Nov. 26, 2008, available at http://www.w3.org/TR/REC-xml/, accessed Jan. 11, 2012, 35 pgs.

Hollenbeck et al. "Guidelines for the Use of Extensible Markup Language (XML) within IETF Protocols", RFC 3470, The Internet Society, Jan. 2003, 29 pgs.

Saint-Andre "Extensible Messaging and Presence Protocol (XMPP): Address Format", IETF RFC 6122 Mar. 2011, IETF Trust 2011, 24 pgs.

Murata et al. "XML Media Types", Network Working Group, RFC 3023 Jan. 2001, The Internet Society 2001, 40 pgs.

Saint-Andre "Extensible Messaging and Presence Protocol (XMPP): Instant Messaging and Presence", IETF RFC 6121 Mar. 2011, IETF Trust 2011, 115 pgs.

Saint-Andre "Extensible Messaging and Presence Protocol (XMPP): Core", IETF RFC 6120 Mar. 2011, IETF Trust 2011, 212 pgs.

Saint-Andre "End-to-End Signing and Object Encryption for the Extensible Messaging and Presence Protocol (XMPP)" Network Working Group, RFC 3923 Oct. 2004, The Internet Society 2004, 28 pgs.

* cited by examiner

CONTEXT DETERMINATION FOR MOBILE DEVICES WHEN ACCESSING REMOTE RESOURCES

TECHNICAL FIELD

This disclosure relates to mobile computing devices.

BACKGROUND

There is a growing demand for mobile computing devices, such as tablet computers and cellular telephones. Often, a user would prefer to carry such mobile computing devices without carrying larger devices, such as laptop computers. In some scenarios, a user may use a mobile device in tandem with other devices, such as laptop and/or desktop computers. However, these mobile computing devices are typically not configured with the same applications as a desktop or laptop computer. Therefore, certain resources that may otherwise be manipulated using a desktop or laptop computer may be unavailable to mobile computing devices.

SUMMARY

In general, this disclosure describes techniques for a mobile device to access resources maintained by a second computing device, generally referred to herein as a remote computing device, such as a desktop computer, workstation, laptop, or other computer. The mobile device generally corresponds to a mobile computing device, such as a tablet computer, a smartphone, or other such device. The second computing device may, for example, be located within a work office or home office of a user. In general, a user uses both the remote computing device and the mobile device to access the resources. In some cases, the second computing device may be considered the primary device for accessing certain resources, such as resources stored locally on the second computing device or within an enterprise server or "cloud" storage associated with the second computing device. When the user is in a location including the remote computing device, such as a home office or work office, the user interacts with the resources using the remote computing device. At other times, when the user is away from the remote computing device, the remote computing device is considered remote to the mobile device. Nevertheless, the user may use the mobile device to access the resources maintained by the remote computing device, in accordance with the techniques of this disclosure.

In some examples, in accordance with the techniques of this disclosure, the remote computing device is configured to generate context information that adaptively controls a presentation of the resources on the mobile computing device. For example, the remote computing device may maintain statistics regarding frequency or patterns of access of certain resources in particular contexts. The remote computing device may maintain such statistics both when the user accesses the resources using the remote computing device itself, as well as when the user accesses the resources using the mobile device. For example, the remote computing device may maintain statistics related to how often particular resources are accessed, times of day at which particular resources are accessed, whether two or more resources are frequently accessed together, whether certain resources are accessed at particular geographic locations more frequently than others, or other such statistics. Accordingly, the remote computing device may use these statistics to determine which of the resources are most likely to be accessed in a particular context. Subsequently, when the mobile device initiates access to the resources via the remote computing device, the remote computing device may provide information to the mobile device to cause the mobile device to display representations (e.g., icons or links) of the resources determined to be most likely to be accessed in the current context. In this manner, the mobile device may provide "one-touch" access to the user's resources using native user interface features provided by the mobile computing device.

The mobile device may be configured with executable software applications specific to the mobile device for some of the resources. However, when the mobile device does not have an application for accessing one of the resources, the mobile device may cause the remote computing device to execute an application to access that resource. The mobile device may further be configured to present execution of the application by the remote computing device in a mobile device specific format. For example, rather than displaying a windowed graphical user interface, the mobile device may ensure that the application is displayed in full screen mode, such that window tools (e.g., minimize and close buttons) are hidden. Likewise, the mobile device may receive mobile device specific input commands, such as pinch-zoom, gestures, rotations, or the like, and translate such commands for the application executed by the remote computing device. Moreover, the mobile device may be configured to display user interface elements for one or more applications executed by the remote computing device, even when the remote computing device does not display such user interface elements.

In one example, a method includes comparing current values for one or more context dimensions to data indicative of relationships between accesses to resources maintained by a remote computing device and values for the one or more context dimensions during the accesses, determining one or more of the resources maintained by the remote computing device that have a high probability of being accessed based on the comparison, and causing a mobile device to obtain information indicative of the determined one or more resources based on the determination that the one or more resources have the high probability of being accessed.

In another example, a device includes one or more processors configured to compare current values for one or more context dimensions to data indicative of relationships between accesses to resources maintained by a remote computing device and values for the one or more context dimensions during the accesses and to determine one or more of the resources maintained by the remote computing device that have a high probability of being accessed based on the comparison, and a network interface configured to cause a mobile device to obtain information indicative of the determined one or more resources based on the determination that the one or more resources have the high probability of being accessed. The device may comprise the mobile device or the remote computing device.

In another example, a system includes a remote computing device configured to maintain resources and to maintain data indicative of relationships between accesses to the resources and values for one or more context dimensions during the accesses, and a mobile device configured to obtain information indicative of one or more of the resources that have a high probability of being accessed by the mobile device based on a comparison of current values for the one or more context dimensions to the data indicative of the relationships.

In another example, a computer-readable storage medium includes, e.g., is encoded with, instructions that, upon execution, cause a processor to compare current values for one or more context dimensions to data indicative of relationships between accesses to resources maintained by a remote computing device and values for the one or more context dimensions during the accesses, determine one or more of the resources maintained by the remote computing device that have a high probability of being accessed based on the comparison, and cause a mobile device to obtain information indicative of the determined one or more resources based on the determination that the one or more resources have the high probability of being accessed.

In another example, a method includes issuing, by a mobile device, a request to access a resource maintained by a remote computing device, wherein the request causes the remote computing device to execute an application to access the resource, receiving information corresponding to graphical output resulting from execution of the application to access the resource from the remote computing device, wherein the graphical output corresponds to a format specific to the remote computing device, presenting a graphical representation of the received information in an output format optimized for the mobile device, receiving an input command in an input format specific to the mobile device, wherein the input command comprises a command for interacting with the application, translating the input command to a format specific to the application executed by the remote computing device, and sending the translated command to the remote computing device.

In another example, a mobile device includes one or more user interfaces for receiving input from a user, a network interface for communicating with a remote computing device, and one or more processors configured to issue, via the network interface, a request to access a resource maintained by the remote computing device, wherein the request causes the remote computing device to execute an application to access the resource, receive, via the network interface, information corresponding to graphical output resulting from execution of the application to access the resource from the remote computing device, wherein the graphical output corresponds to a format specific to the remote computing device, present a graphical representation of the received information in an output format optimized for the mobile device, receive an input command, via one of the user interfaces, in an input format specific to the mobile device, wherein the input command comprises a command for interacting with the application, translate the input command to a format specific to the application executed by the remote computing device, and send, via the network interface, the translated command to the remote computing device.

In another example, a system includes a remote computing device configured to maintain one or more resources and to execute applications for accessing the resources, and a mobile device configured to issue a request to access one of the resources maintained by the remote computing device, wherein the request causes the remote computing device to execute one of the applications to access the resource, receive information corresponding to graphical output resulting from execution of the one of the applications to access the resource from the remote computing device, wherein the graphical output corresponds to a format specific to the remote computing device, present a graphical representation of the received information in an output format optimized for the mobile device, receive an input command in an input format specific to the mobile device, wherein the input command comprises a command for interacting with the one of the applications, translate the input command to a format specific to the one of the applications executed by the remote computing device, and send the translated command to the remote computing device, wherein the remote computing device is configured to perform the translated command during execution of the one of the applications.

In another example, a computer-readable storage medium includes instructions that, when executed, cause a processor of a mobile device to issue a request to access a resource maintained by a remote computing device, wherein the request causes the remote computing device to execute an application to access the resource, receive information corresponding to graphical output resulting from execution of the application to access the resource from the remote computing device, wherein the graphical output corresponds to a format specific to the remote computing device, present a graphical representation of the received information in an output format optimized for the mobile device, receive an input command in an input format specific to the mobile device, wherein the input command comprises a command for interacting with the application, translate the input command to a format specific to the application executed by the remote computing device, and send the translated command to the remote computing device.

The details of one or more examples are set forth in the accompanying drawings and the description below. Other features, objects, and advantages will be apparent from the description and drawings, and from the claims.

DETAILED DESCRIPTION

In general, resources (such as electronic documents, files, software applications, and services) of a modern enterprise are spread across many servers and personal computers, which may be referred to as "data silos." In general, these devices are referred to as remote computing devices in this disclosure. The techniques of this disclosure allow a mobile device to aggregate data and applications from data silos into a single, seamless experience for a user of the mobile device. The data silos may include SharePoint sites, documents from file servers and personal computers, intranet web applications, services, and Windows applications installed on personal computers and/or Citrix/Terminal servers.

A mobile device in accordance with the techniques of this disclosure may also aggregate cloud services into the same view. Moreover, these techniques may provide full view and edit capability to all of these resources (e.g., documents and applications) using native user interface features provided by the mobile computing device. Furthermore, these techniques may leverage mobile device specific applications, such as viewers, editors, and browsers, when possible, and use screencasting when necessary or preferable. The mobile device may be configured to automatically elect to either execute a local application or screencast a remotely executed application, such that a user is not aware of whether a current presentation corresponds to a locally or remotely executed application.

Figure 1:
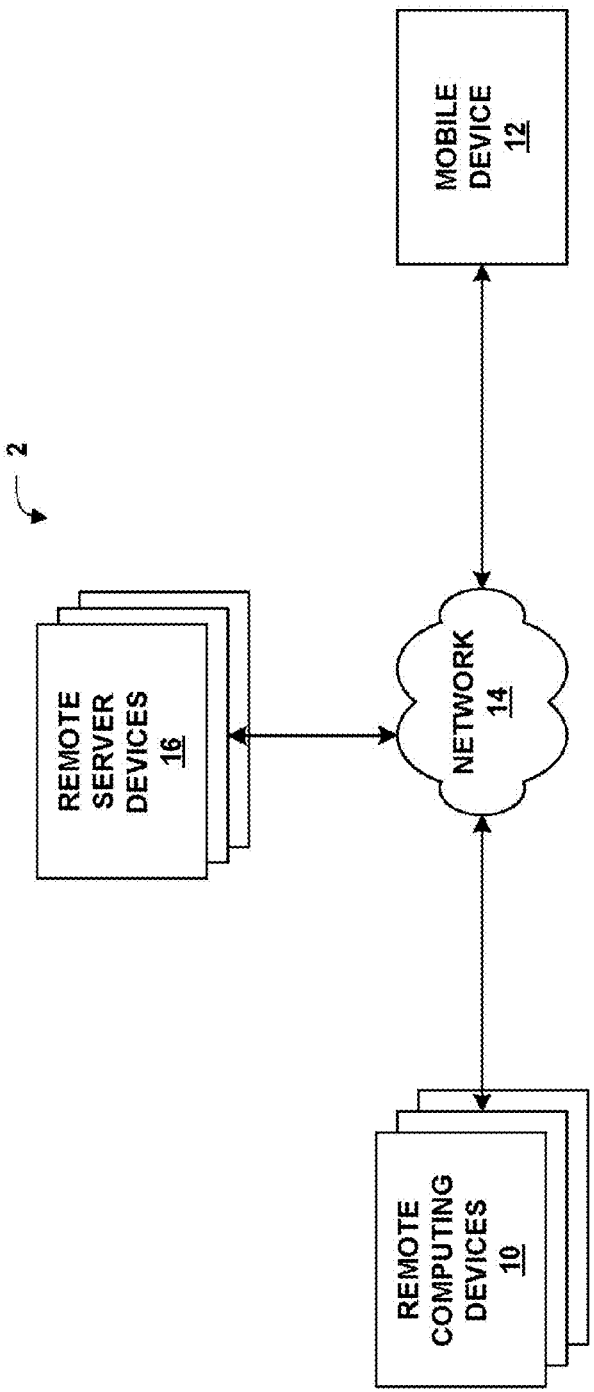
FIG. 1 is a block diagram illustrating an example system in which a mobile device accesses resources maintained by a remote computing device via a network.

FIG. 1 is a block diagram illustrating an example system 2 in which a mobile device 12 accesses resources maintained by any or all of remote computing devices 10 via network 14. Network 14 may represent a public network, such as the Internet, a private network, such as an enterprise network or intranet, or a combination of public and private networks between remote computing device 10 and mobile device 12. Network 14 may include additional network devices not shown in FIG. 1, such as routers, switches, bridges, hubs, gateways, security devices, access points, and the like.

In the example of FIG. 1, system 2 also includes remote server devices 16. Remote server devices 16 generally represent devices associated with storing data for resources maintained by one or more of remote computing devices 10 and/or mobile device 12. Remote server devices 16 may correspond to devices associated with one or more service providers, such as software as a service (SaaS) providers. SaaS providers may include, for example, DropBox, Box.net, Salesforce, or other cloud-based service providers. Remote server devices 16 may, additionally or alternatively, represent file servers that store data at the discretion of remote computing devices 10. In general, remote computing devices 10 may store data to one or more of remote server devices 16.

In this manner, remote server devices 16 may store data on behalf of remote computing devices 10. Nevertheless, because remote computing devices 10 issue commands to store and/or retrieve data from remote server devices 16, resources stored by remote server devices 16 may still be considered to be maintained by remote computing devices 10. In this manner, resources maintained by remote computing devices 10 may include resources stored in storage media of remote computing devices 10 themselves and resources stored by remote server devices 16 at the discretion of remote computing devices 10.

As another example, one or more of remote server devices 16 may correspond to a web server or group of web servers that provide content via hypertext transfer protocol (HTTP), file transfer protocol (FTP), real-time protocol (RTP), or other web-based protocols. Thus, remote server devices 16 may provide resources to remote computing devices 10 and/or mobile device 12 in the form of web pages. Remote computing devices 10 may also store bookmarks to web pages hosted by remote server devices 16. Accordingly, web pages and bookmarks to web pages may be considered resources in accordance with the techniques of this disclosure. In general, web pages hosted by remote server devices 16 would be considered maintained by the respective remote server devices 16. Furthermore, remote server devices 16 may provide one or more applications that can be manipulated via remote devices, such as remote computing devices 10 and/or mobile device 12. Thus, such applications may also be considered resources that are maintained by the respective remote server devices 16. In this manner, remote server devices 16 may also act as remote computing devices 10 as described below.

Remote computing devices 10 represent examples of computing devices that are remote relative to mobile device 12. Typically, a device is considered remote to mobile device 12 when a user of mobile device 12 does not have immediate physical access to the device. For example, one of remote computing devices 10 may represent a desktop computer at the user's office workplace while the user is at home or traveling. As another example, one of remote computing devices 10 may represent a server computer at the user's office that the user can access through a desktop or laptop computer at the user's office. It should also be understood, however, that a user may, in some cases, use mobile device 12 while in the physical location of one or more of remote computing devices 10. For example, mobile device 12 may act as a central aggregation point for various resources maintained by remote computing devices 10.

In general, remote computing devices 10 are configured with one or more applications, such as word processing applications, spreadsheet applications, email applications, drawing applications, web browser applications, presentation development applications, or the like. These applications are typically configured to save data in a particular file format, which is typically represented using a file extension following the last period in a file name for a resource saved by one of the corresponding applications. The manner in which the file format is represented may be based on operating systems executed by remote computing devices 10. Data, such as files, maintained or operated on by applications executed by remote computing devices 10 and stored by remote computing devices 10 (or stored in remote server devices 16 at the discretion of remote computing devices 10) are generally referred to as resources.

Mobile device 12 represents an example of a mobile device used by the user while away from, or while working jointly with, one or more of remote computing devices 10. For example, mobile device 12 may correspond to a tablet computing device, such as an Apple® iPad®, a Microsoft® Windows® operating system-based tablet, or a Google® Android® device. Mobile device 12 may also correspond to a cellular telephone, such as an Apple iPhone, a Windows phone, or a Google Android phone. In accordance with the techniques of this disclosure, mobile device 12 provides access to resources maintained by remote computing devices 10 and/or resources provided by remote server devices 16.

In some examples, mobile device 12 obtains data representative of one or more of the resources that have a high probability of being accessed by the user. Mobile device 12 may then display graphical representations of the one or more resources and/or obtain data for the one or more resources based on the one or more resources having a high probability of being accessed.

Any or all of remote computing devices 10 and mobile device 12 determine resources and/or applications that have a high probability of being accessed. For purposes of discussion, this disclosure generally describes one of remote computing devices 10 as determining which of the resources have a high probability of being accessed. However, it should be understood that mobile device 12 may also, or alternatively, be configured to make these determinations. Moreover, mobile device 12 and/or remote computing devices 10 may be configured to jointly determine which of the resources have a high probability of being accessed.

In some examples, remote computing devices 10 track values for one or more context dimensions for each of the resources. When a resource is accessed, the one of remote computing devices 10 that maintains the resource may update metadata associated with the resource such as, for example, a time of the access (e.g., a timestamp), an identity of a device requesting the access (e.g., one of remote computing devices 10 or mobile device 12), a geographic location of the user during the access (e.g., as determined by a global positioning system (GPS) of mobile device 12), other resources accessed in close temporal proximity to the current resource, or other statistical data that may be useful for determining likelihood (or probability) of resource access in the future.

Remote computing devices 10 and/or mobile device 12 may determine that a resource has a high probability of being accessed when a certain number (e.g., all or a threshold number) of current value(s) for one or more context dimensions for the resource match (e.g., identically or within respective tolerances) values for the one or more context dimensions during historical accesses of the resources. In some examples, remote computing devices 10 and/or mobile device 12 may calculate a value representative of the probability of a resource being accessed based on any or all of how many of the context dimensions have current values that match the values of the resource for the context dimensions. Moreover, in some examples, resources may be determined to have a high probability of being accessed when the values representative of the probability exceed a threshold, or when the values representative of the probabilities for a certain set of resources exceed values representative of the probabilities for a remaining set of resources.

In some examples, a "match" may correspond to identical values for the context dimension, while in other examples, a match may correspond to values within a particular tolerance range. In still other examples, the value representative of the probability may correspond to an aggregation of differences between current values for the context dimensions and values for the context dimensions during accesses of the resources. Various rules for determining probabilities may also be defined that incorporate any or all of these factors, or various combinations of these factors. For example, the rules may require exact matches for some context dimensions, allow for a degree of tolerance to determine a match for other context dimensions, and provide scores corresponding to differences between current values and historical values for still other context dimensions. Thus, a match may include an exact match, values within a degree of tolerance, and differences between values for a context dimension. Various weights may also be assigned to the context dimensions, such that a match for one context dimension may have a higher influence on the value representative of the probability than a match for another context dimension.

Accordingly, when the user begins using mobile device 12 (e.g., when mobile device 12 is turned on or when mobile device 12 logs into one or more of remote computing devices 10), the one or more of remote computing devices 10 may determine current values for the various context dimensions. For example, any or all of remote computing devices 10 may determine a current time of day, an identity of the device, a geographic location of the user, whether other resources have recently been accessed, and/or other such data. The collection of current values for the one or more context dimensions may be referred to as a context for mobile device 12. Based on the current values, or the current context, the one or more of remote computing devices 10 determine which of the resources have a high probability of being accessed in the near future.

Remote computing devices 10 may additionally or alternatively be configured to analyze frequencies of accesses of the resources. That is, remote computing devices 10 may calculate values representative of how frequently certain resources have been accessed recently, relative to the other resources. For example, remote computing devices 10 may calculate a relative percentage of accesses of the various resources over a period of time (e.g., the last day, week, month, or year) for the various resources. Remote computing devices 10 may determine the frequency of access globally and/or within the current context of mobile device 12. Thus, remote computing devices 10 may analyze frequency of access when determining resources that have a high probability of being accessed. Accordingly, statistics relating to frequency of access may also be referred to as values of a context dimension, such as frequency of access dimension. Moreover, remote computing devices 10 may be configured to analyze patterns of access, which may or may not include temporal frequency of access.

After determining one or more resources that have a high probability of being accessed, remote computing devices 10 sends data for the one or more resources to mobile device 12. This data may include data of the resources themselves, such as graphical icons, textual names, snapshots, and/or full files for the resources, and/or instructions for presentation of representations of the one or more resources. For example, one of remote computing devices 10 may instruct mobile device 12 to place icons for the highest probability resources in a relatively easily accessible and highly visible screen location (e.g., the center of the screen), and lower probability resources in a less immediate but still accessible screen location. One of remote computing devices 10 may also (or alternatively) send instructions for how to display the representations themselves. For example, one of remote computing devices 10 may send an instruction indicating a size of an icon for a particular resource based on how probable the resource is to be accessed in the current context.

In this manner, mobile device 12 may present representations of resources that have a high probability of being accessed by the user, where the resources may be stored by one or more of remote computing devices 10 or remote server devices 16. Thus, higher-probability resources may be substantially simpler for the user to access, without needing to hunt through multiple screens to find the most relevant data to the user. In this manner, the techniques of this disclosure may support one-touch access to the user's resources when using mobile device 12. In addition to presentation of the representations, these techniques may be used to temporarily cache resources that are determined to have a high probability of access by mobile device 12. That is, mobile device 12 may receive copies of one or more resources, from remote computing device 10, that have a high probability of being accessed.

Mobile device 12 may execute an operating system that differs from an operating system of remote computing device 10. For example, remote computing device 10 may execute a Microsoft Windows based operating system, a Unix based operating system, a Linux based operating system, or other such operating system typically installed on desktop or server computing devices. Mobile device 12, on the other hand, may execute an operating system such as Apple iOS or Google Android. In some examples, remote computing device 10 and mobile device 12 execute different versions of the same operating system, or different instances of the same operating system.

In any case, for purposes of discussion of the techniques of this disclosure, it is assumed that, in some cases, at least one application installed on remote computing device 10 does not have a counterpart installed on mobile device 12. In such cases, mobile device 12 causes remote computing device 10 to execute the application installed on remote computing device 10 in order to interact with resources maintained by that application. However, mobile device 12 may be configured to display output from the application in a format that is optimized for mobile device 12.

In general, applications designed for mobile device 12 conform to a particular output format. For example, applications executed by mobile device 12 are typically displayed full-screen rather than windowed, share a particular font size for displayed text, and otherwise have a common look and feel. Applications executed by remote computing device 10, on the other hand, tend to have a different output format, e.g., being windowed with various text sizes, and otherwise having a more application-specific output format. Thus, rather than directly displaying output from an application executed by remote computing device 10, mobile device 12 may present a graphical representation of the received information in an output format optimized for mobile device 12.

In addition, mobile device 12 typically includes input elements that are not typically present on remote computing device 10. For example, mobile device 12 typically includes a camera, an accelerometer, and a touchscreen display. The operating system of mobile device 12 may further be configured to interpret certain gestures, screen touch commands, or other input commands in a particular way. For example, mobile devices typically interpret multi-touch "pinching" of the display as zooming in or zooming out. Mobile device 12 may be configured to convert such device-specific input commands, received when mobile device 12 causes remote computing device 10 to execute an application, to an appropriate command for the executed application. For example, rather than zooming the entire displayed window in response to a pinch-zoom command, mobile device 12 may send an instruction to the application to enlarge displayed text only. As another example, when a user takes a picture with a camera of mobile device 12, mobile device 12 may make the picture available to the application, e.g., by sending the picture to a data buffer, such as a software-based clipboard, of the operating system of remote computing device 10.

Accordingly, remote computing device 10 represents an example of a computing device for determining a set of one or more resources that have a high probability of being accessed in the near future. Remote computing device 10 may receive a request from mobile device 12 for information relating to resources maintained by remote computing device 10 that have a high probability of being accessed by mobile device 12. Mobile device 12 may construct the request such that the request specifies values for one or more context dimensions. As noted above, the context dimensions may include, for example, a geographic location of the user, an identifier for mobile device 12, a current time, or other such information.

After receiving the request, remote computing device 10 may compare the values for the one or more context dimensions to data indicative of relationships between access to resources maintained by remote computing device 10 and values for the one or more context dimensions. Moreover, as noted above, remote computing device 10 may collect statistics and metadata for the resources to construct the relationships. For example, remote computing device 10 may collect metadata including timestamps, geographic locations of a user, and identities of devices when a particular resource maintained by remote computing device 10 is accessed. Additionally or alternatively, the relationships may specify a frequency of access to the resources, e.g., as a percentage of total resource accesses over a period of time.

Based on the collected statistics and the context of mobile device 12 when the request is received, remote computing device 10 may determine one or more of the resources that have a high probability of being accessed. In this manner, remote computing device 10 may determine one or more of the resources maintained by remote computing device 10 that have a high probability of being accessed by mobile device 12 based on the comparison of the values for the one or more context dimensions to the data indicative of the relationships.

Remote computing device 10 may then send information indicative of the determined one or more resources to mobile device 12. For example, remote computing device 10 may send a list identifying the resources in order of the determined probability of access. There may be a cutoff threshold for the probability to terminate the list. In some examples, remote computing device 10 may send instructions to mobile device 12 as to how to display representations of the resources determined to have a high probability of being accessed. Moreover, remote computing device 10 may send data of the resources (e.g., the files themselves) to mobile device 12 to cache the resources at mobile device 12 for easy, fast access by mobile device 12 in response to a user's selection of one of the resources.

Mobile device 12 represents an example of a mobile device for manipulating resources maintained by remote computing device 10 using either an application executed by mobile device 12 or an application executed by remote computing device 10 at the control of mobile device 12. In one example, mobile device 12 issues a request to access a resource maintained by remote computing device 10. In some examples, mobile device 12 may first display representations of one or more resources determined to have a high probability of access, as discussed above. Accordingly, a user may select one of the displayed representations to request to access the resource.

The request issued by mobile device 12 may be configured to cause remote computing device 10 to execute an application to access the resource. For example, mobile device 12 may be configured to determine whether mobile device 12 includes a local application for manipulating the selected resource. If mobile device 12 does not include such a local application, mobile device 12 may cause remote computing device 10 to execute a remote application for manipulating the resource. In accordance with the techniques of this disclosure, mobile device 12 may provide input and output features to cause the user experience the remote application as if the application were being executed locally by mobile device 12.

For example, mobile device 12 may receive information corresponding to graphical output resulting from execution of the application to access the resource from remote computing device 10. The information corresponding to the graphical output may correspond to draw commands, raw or encoded image data, or other information indicative of the graphical output resulting from execution of the application. Moreover, the graphical output corresponds to a format specific to remote computing device 10.

In accordance with the techniques of this disclosure, mobile device 12 may present a graphical representation of the received information in an output format optimized for the mobile device. For example, regardless of the format for output on remote computing device 10, mobile device 12 may present the graphical output in such a way that is substantially standard across applications executed by mobile device 12. For example, mobile device 12 may be configured to always display executed applications in full screen mode. Accordingly, mobile device 12 may display output of the application executed by remote computing device 10 in a full screen mode, such that windowing elements (e.g., screen size adjustments and close window icons) are hidden. Likewise, mobile device 12 may ensure text font and size uniformity across applications for which output is displayed by mobile device 12.

Moreover, mobile device 12 may receive an input command in an input format specific to the mobile device, where the input command comprises a command for interacting with the application. For example, mobile device 12 may receive a pinch-zoom command, a command to capture a picture, accelerometer input, or other such format special format that is relatively unique to mobile device 12. Mobile device 12 may translate the input command to interact with the application being executed by remote computing device 10. In this manner, mobile device 12 may translate the input command to a format specific to the application executed by remote computing device 10. For example, mobile device 12 may ensure that a pinch-zoom command is converted to a command to zoom in the application being executed by remote computing device 10, rather than a command to zoom the full contents of the current display on mobile device 12. Moreover, mobile device 12 may send the translated command to remote computing device 10.

These techniques may provide an easy-to-deploy, IT-ready solution. IT capabilities may include authentication and user permissions from existing AD or LDAP servers, support for RSA token as additional authentication factor, full IT control, logging, and monitoring facilities for governance and compliance, device authentication with industry-standard SSL certificates, policy requiring specific device configurations, geographical restrictions, and the like, and data protection to prevent "leakage" from mobile device.

Furthermore, deployment of these techniques may be done in just a few minutes. For example, firewalls and servers generally need not be specially configured. In general, a full deployment requires only one computing device (although as discussed, additional computing devices may be involved). In general, users (or IT administrators) may perform a one-time enrollment of mobile devices, such as mobile device 12, which may result in an SSL certificate being loaded on each authorized device. Devices may be authenticated with SSL certificates distributed to the devices. For example, one of remote computing devices 10 may authenticate mobile device 12 using an SSL certificate. Users may be authenticated with their domain credentials before getting access to resources of remote computing devices 10 and/or remote server devices 16.

In accordance with these techniques, users can access SharePoint Servers, Windows Applications, documents on file servers and their PC, all from their mobile device, with native user experience and controls. IT administrators may also maintain full manageability, control, and monitoring of users and their actions, without taking over the rest of the user's mobile device. Furthermore, the users need not configure VPN settings to gain access to the resources.

Figure 2:
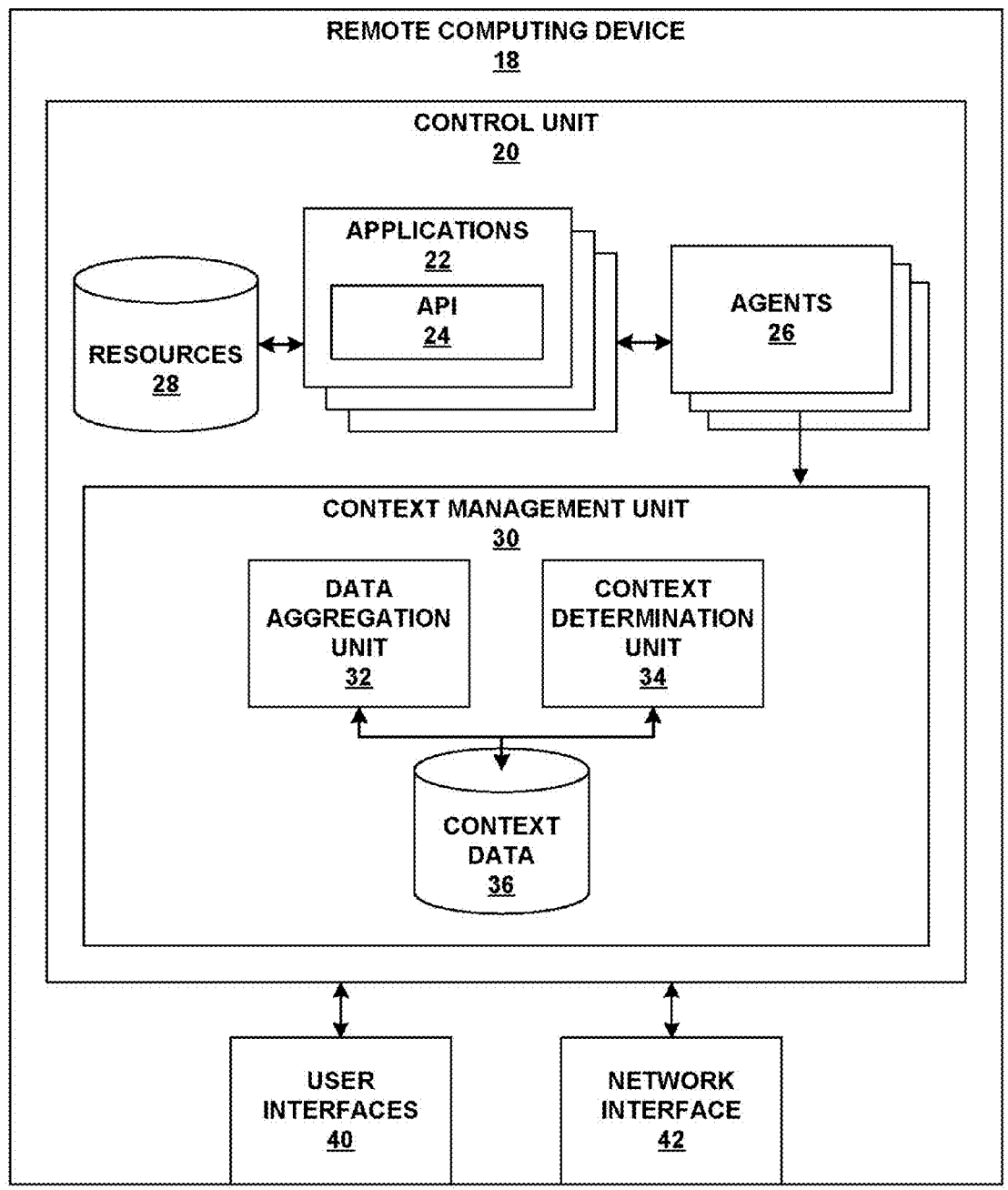
FIG. 2 is a block diagram illustrating an example set of components of one of the remote computing devices of FIG. 1.

FIG. 2 is a block diagram illustrating an example set of components of remote computing device 18, which may correspond to one of remote computing devices 10 in FIG. 1. In this example, remote computing device 18 includes control unit 20, user interfaces 40, and network interface 42. User interfaces 40 include one or more input and/or output interfaces, such as a keyboard, mouse, monitor, touchscreen, printer, camera, webcam, microphone, speakers, or the like for receiving input and/or providing output. Network interface 42 corresponds to an interface for interacting with other devices over network 14 (FIG. 1). Network interface 42 may allow for wired or wireless network transmissions according to various network protocols, such as Ethernet, 802.11 series protocols, asynchronous transfer mode (ATM), transmission control protocol/Internet protocol (TCP/IP), user datagram protocol (UDP), or the like.

Control unit 20 represents any combination of hardware, software, and/or firmware elements for performing the functionality attributed to control unit 20. When implemented in software or firmware, it is assumed that control unit 20 also includes requisite hardware for executing such software or firmware, such as, for example, one or more hardware-based processors or processing units. Processors of control unit 20 may include one or more of microprocessors, digital signal processors (DSPs), application specific integrated circuits (ASICs), field programmable gate arrays (FPGAs), or any other equivalent integrated or discrete logic circuitry, as well as any combinations of such components.

Control unit 20 may further include physical, non-transitory storage media for storing software or firmware instructions. The storage media may include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media.

Control unit 20 also maintains resources 28. Resources 28 may be stored in a local storage medium, such as any of the storage media described above. In other examples, remote computing device 18 may maintain resources stored on a separate device, such as a shared network drive, a server accessible via a network connection, or other storage location accessible by remote computing device 18. Resources 28 may correspond to files associated with particular ones of applications 22. For example, resources 28 may include word processing documents, spreadsheet documents, graphical documents, presentation documents, email messages, bookmark data for a web browser, media or multimedia files such as pictures, music, or video, or other documents. In some examples, resources 28 may include, additionally or alternatively, web pages served by a web server and/or applications which are executed on another server, such as a Citrix server.

In the example of FIG. 2, control unit 20 executes applications 22 and agents 26. Control unit 20 also includes context management unit 30, which determines context information for resources 28, e.g., values for one or more context dimensions. As noted above, the context dimensions may include time of access of resources 28, geographic location of a user when resources 28 are accessed, an identity of the device used to access resources 28 (e.g., remote computing device 18, mobile device 12, or another device), frequency patterns of access, other users' access that may indicate relevance to a particular user, most recent modification time, or the like. In particular, agents 26 monitor execution of applications 22 using application programming interfaces (APIs) 24. That is, APIs 24 provide interfaces for agents 26 to monitor which of resources 28 are accessed by applications 22. Thus, when one of applications 22 opens, creates, modifies, or saves one of resources 28, a corresponding one of agents 26 may determine which of resources 28 was accessed. The one of agents 26 may then provide information indicative of the one of resources 28 that was accessed to context management unit 30. In some examples, additional or alternative APIs may be provided to resources behind the applications. For example, APIs may be provided that monitor changes to the file system.

When agents 26 indicate that one of resources 28 has been accessed, context management unit 30 collects metadata, such as values for the various context dimensions, for the one of resources 28. Data aggregation unit 32 of context management unit 30 collects values of the various context dimensions and stores these values, along with an identifier of the one of resources 28, as context data 36. Context data 36 may be represented as a table including columns representative of the various context dimensions and resources and rows representative of accesses of the resources and values for the various context dimensions. The table may have key values corresponding to the time of a resource access, where the key values are values for uniquely identifying an entry of the table. In some examples, context data 36 is represented by one or more extensible markup language (XML) documents.

In addition, data aggregation unit 32 may also calculate various metrics for resources 28 based on context data 36. For example, data aggregation unit 32 may review entries of context data 36 to determine frequency of access to individual ones of resources 28. Data aggregation unit 32 may determine, for example, a raw value or a percentage of accesses of particular ones of resources 28 over a time period or over a number of accesses (e.g., the last day, week, or month, or the last 50 or 100 accesses). In this manner, data aggregation unit 32 may aggregate values representative of frequency of access to resources 28.

As described below, mobile device 12 (FIG. 1) may be configured to retrieve entries of context data 36. Rather than requesting all of context data 36 with each request, mobile device 12 may send a request specifying a last entry of the received context data, based on the last timestamp received. In this manner, context management unit 30 may send new entries of context data 36 to mobile device 12, without resending context data that has already been received by mobile device 12. In particular, context management unit 30 may determine entries having a timestamp greater than the timestamp specified in the request received from mobile device 12, and send data representative of such entries to mobile device 12 in response to the request. In this manner, mobile device 12 may use the locally stored context data to determine one or more of resources 28 that have a high probability of being accessed via mobile device 12.

As an alternative, data aggregation unit 32 may generate aggregate data for mobile device 12. For example, data aggregation unit 32 may generate lists of documents, applications, or other resources that satisfy one or more relevance criteria, e.g., one or more values of context dimensions. For example, data aggregation unit 32 may filter indicators of resources by recent resources, resources that are frequently accessed, resources that form part of a particular project, or the like. Thus, rather than providing raw context data to mobile device 12, remote computing device 18 may provide aggregate data to mobile device 12. In some examples, remote computing device 18 may provide both aggregate data and raw context data to mobile device 12.

Context management unit 30 is configured to communicate with a corresponding unit of mobile device 12 (e.g., context management unit 60 in FIG. 3) using a particular communication protocol, such as extensible messaging and presence protocol (XMPP). XMPP allows for communications based on XML. Accordingly, representing context data 36 as XML data may provide for simple transmission of context data 36 to mobile device 12. XMPP is described in greater detail in RFC 3923, "End-to-End Signaling and Object Encryption for the Extensible Messaging and Presence Protocol (XMPP), by P. Saint-Andre, Jabber Software Foundation, October 2004; RFC 6120, "Extensible Messaging and Presence Protocol (XMPP): Core," by P. Saint-Andre, Cisco, March 2011; RFC 6121, "Extensible Messaging and Presence Protocol (XMPP): Instant Messaging and Presence," by P. Saint-Andre, Cisco, March 2011; and RFC 6122, "Extensible Messaging and Presence Protocol (XMPP): Address Format," by P. Saint-Andre, Cisco, March 2011, each of which is hereby incorporated by reference in its respective entirety. XML is described in greater detail in "Extensible Markup Language (XML) 1.0 (Fifth Edition)," W3C Recommendation 26 Nov. 2008, Bray et al., eds., available at http://www.w3.org/TR/xml/; RFC 3023, "XML Media Types," by M. Murata et al., January 2001; and RFC 3470, "Guidelines for the Use of Extensible Markup Language (XML) within IETF Protocols," by S. Hollenbeck et al., January 2003, each of which is hereby incorporated by reference in its respective entirety.

Alternatively, mobile device 12 may send a request specifying current values for one or more of the context dimensions to remote computing device 18. Context determination unit 34 may process the received values of the context dimensions to determine one or more of resources 28 that have a high probability of being accessed via mobile device 12. Context management unit 30 may send a list of the one or more resources to mobile device 12, or may further provide instructions to mobile device 12 that cause mobile device 12 to present representations of any or all of the one or more of resources 28. As discussed in greater detail below with respect to FIG. 3, these instructions may correspond to instructions on screen locations for icons corresponding to the one or more resources, sizes of the icons, groupings of the icons, or other instructions related to representing the one or more resources determined to have a high probability of access via mobile device 12.

In this manner, remote computing device 18 and/or mobile device 12 may use current values for one or more context dimensions to determine one or more of resources 28 that have a high probability of being accessed in the near future by mobile device 12.

In addition, as shown in FIG. 2, applications 22 are executed by control unit 20. In particular, applications 22 are generally designed to be executed on computing devices similar to remote computing device 18. For example, control unit 20 may execute an operating system that defines an operating environment for which applications 22 were designed. Assuming, for example, that the operating environment provides windowed representations of executing applications via a display of user interfaces 40, applications 22 may be displayed in respective windows on the display during execution.

In some cases, however, as discussed in greater detail below, control unit 20 may provide information corresponding to graphical output of execution of one or more of applications 22 to mobile device 12 via network interface 42. For example, the graphical output may include a representation of at least a portion of one of resources 28 being accessed by the one of applications 22 and graphical user interface elements, such as buttons, scroll bars, menus, toolbars, or other such user interface elements. Buttons may be realized as physical buttons on the housing for mobile device 12 or as virtual elements displayed on a touchscreen, e.g., as graphical user interface elements. Control unit 20 may provide the information corresponding to the graphical output to mobile device 12 in accordance with XMPP, in some examples. As discussed below, mobile device 12 may be configured to modify the graphical output to a format that is determined to be optimal for mobile device 12, rather than displaying what would conventionally be displayed on the display of user interfaces 40 of remote computing device 18.

During execution of the one of applications 22, remote computing device 18 receives commands from mobile device 12 via network interface 42. The commands may include commands to interact with the one of applications 22, e.g., to modify data of the accessed one of resources 28. For example, when the application is a word processing application and the resource is a text document, remote computing device 18 may receive commands to add, delete, or format text of the text document. Remote computing device 18 may also receive commands for interacting with the application itself, for example, to zoom in on the text being displayed without actually changing the formatting of the text in the text document resource.

Figure 3:
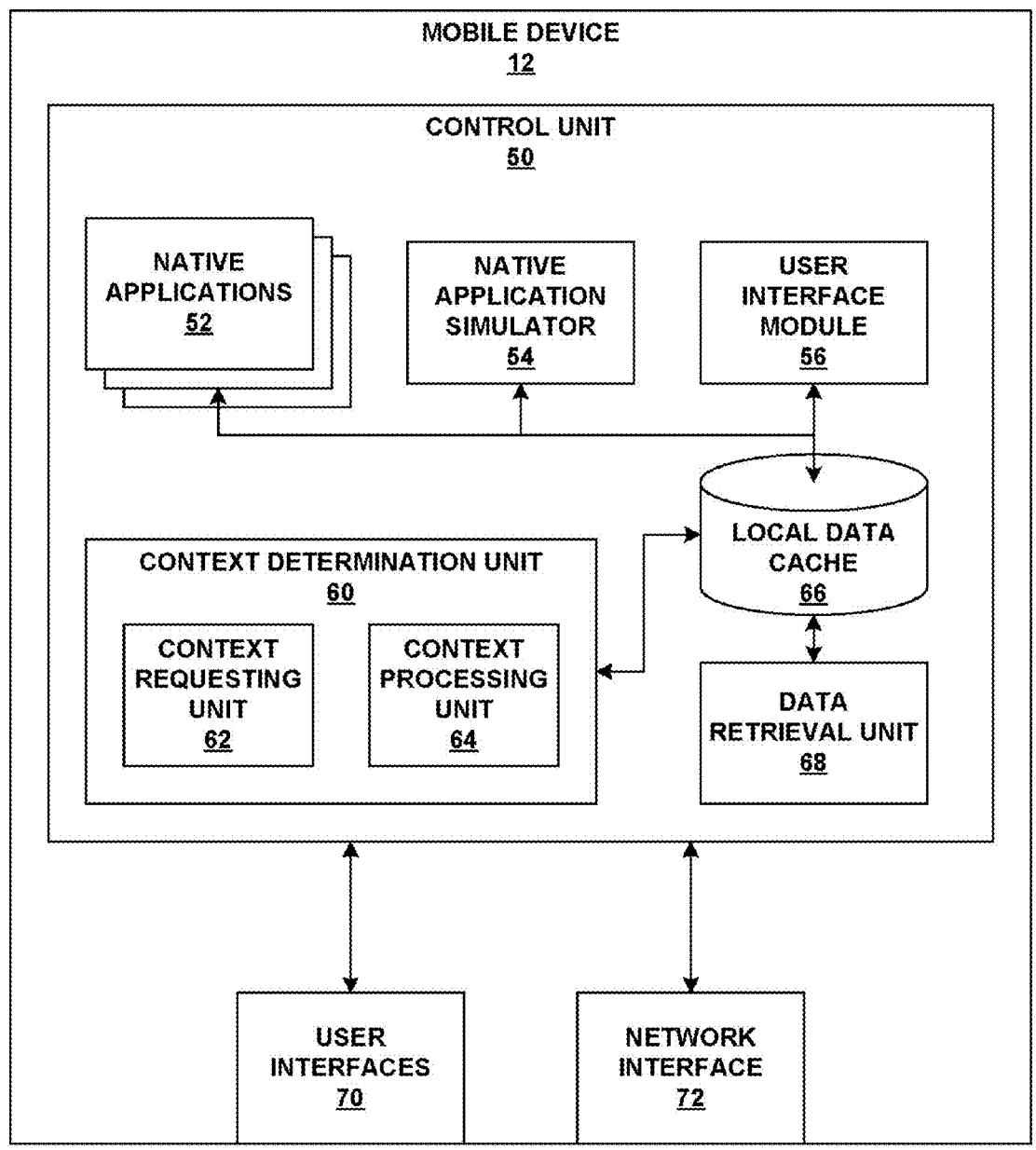
FIG. 3 is a block diagram illustrating an example set of components of the mobile device of FIG. 1.

FIG. 3 is a block diagram illustrating an example set of components of mobile device 12. In this example, mobile device 12 includes control unit 50, user interfaces 70, and network interface 72. User interfaces 70 may again include one or more interfaces for providing input and/or output, as discussed with respect to user interfaces 40 of FIG. 2. Likewise, network interface 72 provides a network connection such that mobile device 12 is able to communicate with other network devices, such as remote network devices 10, via network 14. Also like in the example of FIG. 2, control unit 50 may be implemented in hardware, software, firmware, or a combination thereof. When implemented in software or firmware, requisite hardware, such as computer-readable storage media for storing instructions and one or more processors for executing the instructions, is assumed to be provided as well.

In this example, control unit 50 executes native applications 52, native application simulator 54, user interface module 56, and data retrieval unit 68. Control unit 50 also includes context determination unit 60, which itself includes context requesting unit 62 and context processing unit 64. Control unit 50 further includes local data cache 66, which may correspond to data stored in one or more computer-readable media of mobile device 12. The user utilizes user interfaces 70 for input and output when executing native applications 52, such as a touchscreen interface, physical manipulation of mobile device 12 recognized by an accelerometer of user interfaces 70, a camera of user interfaces 70, communicatively coupled input or output devices such as a wireless keyboard and/or a wireless mouse, which may be coupled using Bluetooth, or other such input and/or output interfaces.

Native applications 52 correspond to applications installed on and executed by control unit 50. Some of native applications 52 may substantially correspond to applications 22 installed on remote computing device 18 (FIG. 2). Accordingly, if a user requests to access one of resources 28 maintained by remote computing device 18, and one of native applications 52 is capable of manipulating the resource, control unit 50 may execute the corresponding native application to access the resource. All or a portion of data for the resource may be cached locally in local data cache 66. After making changes to the resource, e.g., in response to a save and/or close command issued to the local application, control unit 50 may send data representative of the changed resource to remote computing device 18 via network interface 72, e.g., in accordance with XMPP. In some examples, native applications 52 may implement only a portion of the functionality of corresponding applications executed by one of remote computing devices 10. For example, one of native applications 52 may have only the ability to read, but not edit, resources of a particular type.

In some cases, a user may attempt to access one of resources 28 which none of native applications 52 is capable of accessing. Alternatively, although one of native applications 52 may be capable of accessing a resource, mobile device 12 may include configuration data indicating that an application executed by remote computing device 18 is preferable over native applications 52 for the resource. For example, as noted above, one of native applications 52 may not implement the full functionality of a corresponding application executed by remote computing device 18, and thus, the application executed by remote computing device 18 may be determined to be preferable. In these cases, native application simulator 54 sends instructions to remote computing device 18 (or another one of remote computing devices 10) via network interface 72 to cause remote computing device 18 to execute one of applications 22, and to display graphical output of the one of applications 22 via a display of user interfaces 70. Moreover, native application simulator 54 is configured to simulate execution of the application locally, such that the user experiences the application as if the application were being executed locally.

For example, there may be one or more execution characteristics that apply generally to all native applications 52. As one example, when one of native applications 52 is executed, the native application may occupy the entire screen of a display of user interfaces 70, rather than being a windowed application. As another example, the formatting of text displayed during execution of native applications 52 may be consistent across native applications 52. For example, text may be displayed in a particular font and have a minimum font size and/or a maximum font size.

Moreover, user interface module 56 is generally configured to intercept specific input commands that apply either to operating system commands or specific commands for interacting with an application currently being executed. For example, a touchscreen display of user interfaces 70 may allow single touch or multitouch commands, such as pinch-zoom, swiping between applications to change which application is currently displayed, swiping to reveal a status bar, swiping to scroll horizontally or vertically, rotational gestures to rotate a display, navigating "back" or "forward" in a web browser, taps, multitaps, or long presses to select or interact with graphical user interface elements, flicks to navigate between documents, or the like. Such touch or multitouch commands are typically not supported by applications 22 executed by remote computing device 18, and therefore, native application simulator 54 is configured to translate such commands to analogous commands of applications 22.

In general, when a user uses one of user interfaces 70 of mobile device 12, native application simulator 54 is configured to translate the use of that interface to an appropriate action for interacting with one of applications 22 executed by remote computing device 18. For example, if a user were to use a camera of user interfaces 70 to capture an image, native application simulator 54 may send data of the captured image to a clipboard of an operating system of remote computing device 18 or directly into a specific document or application, such that the image is available for use by the one of applications 22.

Moreover, native application simulator 54 may translate graphical output resulting from execution of the one of applications 22 into a format that is optimized for mobile device 12. For example, as noted above, native applications 52 may all be executed in a full screen mode. Whereas the one of applications 22 may be executed in a window on remote computing device 18, native application simulator 54 may modify the output of the application such that window elements (e.g., minimize, maximize, and close buttons) are hidden and such that the application is displayed full-screen on a display of user interfaces 70.

As another example, native application simulator 54 may increase or decrease font sizes, or otherwise modify font formats, to be consistent with a font schema specific to mobile device 12. As a further example, native application simulator 54 may convert a color palette for output resulting from execution of one of applications 22 to a color palette schema defined for mobile device 12.

In this manner, the output of the one of applications 22 executed by remote computing device 18 may appear as if the application is being executed locally on mobile device 12, when in fact the application is being executed by remote computing device 18. Likewise, input commands issued to mobile device 12, which may be specific to mobile device 12, may be converted to appropriate commands for the one of applications 22 executed by remote computing device 18.

Furthermore, native application simulator 54 may provide additional or alternative graphical user interface elements when one of applications 22 is being executed by remote computing device 18 and displayed on a display of user interfaces 70. For example, for a word processing application, native application simulator 54 may display a "spellcheck" button on a display of user interfaces 70, even though the graphical output resulting from execution of the application by remote computing device 18 does not include a spellcheck button. Accordingly, if a user selects the spellcheck button, e.g., by tapping the spellcheck button, native application simulator 54 translates the selection to an appropriate command to initiate a spellcheck function by the application executed by remote computing device 18. Similarly, native application simulator 54 may hide one or more graphical user interface elements that would otherwise be displayed during execution of the application by remote computing device 18.

Native application simulator 54 may also be configured to generate a menu system built natively for mobile device 12, which may replace or supplement a menu system of the application executed by remote computing device 18. In this manner, the menu system built natively for mobile device 12 may act as a substitute menu system that is displayed in place of the menu system for the application executed by the remote computing device. Moreover, native application simulator 54 may generally hide the mobile device menu until a request to view the menu (such as a pull-down gesture) is received. Native application simulator 54 may further resize one or more graphical user interface elements, e.g., to enlarge these elements, which may simplify finger-touch selection of the elements. For example, native application simulator 54 may resize icons on the Microsoft Office "Ribbon" toolbar. As another example, native application simulator 54 may resize a context menu, e.g., a menu produced by right-clicking on a resource.

Native application simulator 54 may also display buttons that cause a sequence of actions on the desktop-executed application to occur. For example, the buttons may be mapped to macros that send a series of commands to the desktop-executed application. Moreover, native application simulator 54 may disable certain commands or hide certain graphical user interface elements. In this manner, one or more buttons illustrated by native application simulator 54 may be mapped to "macros" that represent one or more actions to be executed by the remote computing device. In some examples, the button may be mapped to a series of commands to be issued by mobile device 12 to the remote computing device. In some examples, the series of commands may be encapsulated within a script that is issued to the remote computing device, which may cause the remote computing device to execute the script, and thereby perform each action.

Furthermore, native application simulator 54 may display mobile device specific buttons for commands that are performed during execution of an application by the remote computing device. For example, native application simulator 54 may display mobile device specific buttons for saving a current document, deleting or renaming a file for the document, formatting options such as bold, underline, or italics, or the like.

In some examples, a sequence of commands may cause the remote computing device to move data for resources maintained by the remote computing device between remote computing devices 10, remote server devices 16, and/or mobile device 12. For example, the commands may cause the remote computing device to send data for one of the resources between any or all of Google Docs, Box.net, an iPad, and a personal computer. The commands may also cause one or more devices to share a document. For example, data for a resource may be moved to a location that is accessible to all devices needing access to the document, e.g., one of remote server devices 16, and two or more devices may simultaneously access the resource. Alternatively, the commands may cause the remote computing device to email or otherwise distribute the document to other devices.

Some commands may be considered inappropriate for mobile device 12, and may therefore be disabled. Graphical user interface elements for performing such commands may be hidden, greyed out and thereby unselectable, or removed entirely from the display by native application simulator 54. For example, MS Office offers a "Customize Keyboard" option that is typically not appropriate for touchscreen based devices. Therefore, native application simulator 54 may hide or remove this element. As another example, native application simulator 54 may disable user interface controls based on policies, such as preventing unlocking of a password protected document by omitting display of a screen to enter the password. Likewise, lesser-used commands may be removed (e.g., by configuration or dynamically) to reduce clutter. These removed commands may be replaced in a separate user interface window that the user may specifically request. Moreover, native application simulator 54 may provide a "view-only" mode for viewing resources, to avoid inadvertent changes to the document.

Native application simulator 54 may also change displayed text associated with certain commands. For example, native application simulator 54 may change the word "click" to "touch," change "mouse wheel" to "two-finger touch," or make other appropriate changes.

As another example, native application simulator 54 may replace a login screen, e.g., for user access control (UAC), with a mobile device specific login screen for logging into one or more of remote computing devices 10. In this manner, the user may use the mobile device specific login screen to log into one or more remote devices.

In addition, or in the alternative, native application simulator 54 may display graphical user interface elements that are mapped to device-specific commands, which may allow actions that would not typically be performed on a desktop application. For example, native application simulator 54 may allow a user to tag a document with a geographic location (e.g., GPS coordinates), attach a picture to a document (or other resource) from a camera, move data for one of the resources to mobile device 12 (or move data from mobile device 12 to the remote computing device), cut and paste between a resource managed by remote computing device 18 and a local resource of mobile device 12, or other such actions. Furthermore, in some examples, native application simulator 54 may provide the ability to display two documents side-by-side for special workflow cases. For example, a user may wish to view two documents side-by-side in order to cut and paste between the documents, refer to one document while editing another document, or other such scenarios. In this manner, native application simulator 54 may provide the user with the ability to view two documents simultaneously.

Moreover, in some examples, native application simulator 54 may be configured to present various workflow-specific graphical user interfaces. That is, native application simulator 54 may be configured to present groups of graphical user interface elements, e.g., buttons, organized around a particular workflow, to make that workflow easier. For example, for a "review changes" workflow, native application simulator 54 may display buttons for commands related to reviewing changes, such as accept or reject change, go to next or previous change, or the like. As another example, for a commenting workflow, the buttons may include add or delete comment buttons and go to next or previous comment. In addition, native application simulator 54 may depict buttons for more simple navigation of a document, such as by displaying a table of contents that depicts pages of the document, such that touching a page allows the user to access the selected page.

In this manner, mobile device 12 may be configured to improve a user's experience when interacting with resources 28 maintained by remote computing device 18. That is, the user may experience interactions with resources 28 in such a way that the user is not necessarily aware of whether the application being used to interact with resources 28 is a native application, e.g., native applications 52, or a remote application, e.g., one of applications 22 that is augmented by native application simulator 54. Accordingly, a user may feel as if the applications used to access resources 28 are native applications to mobile device 12, regardless of what one of resources 28 is being accessed.

To further improve a user's experience, mobile device 12 may be configured to determine one or more of resources 28 maintained by remote computing device 18 or resources maintained by any of remote computing devices 10, that have a high probability of being accessed at a particular time or in a particular context. For example, as discussed above, remote computing device 18, mobile device 12, or other devices may keep track of context data, representative of accesses to each of resources 28, as well as values for various context dimensions when the accesses occur. Using the context data, as well as a current context, remote computing device 18, mobile device 12, or another device may determine which of resources 28 have a high probability of being accessed, given the current context.

Suppose, for example, that a particular user accesses email as the first action taken on mobile device 12 every day at approximately the same time in the morning. The context data would include data representative of times that an email mailbox resource is accessed. Thus, when the user begins a session using mobile device 12 at that time in the morning on later days, mobile device 12 (or remote computing device 18) may determine that, because of the current time, there is a high probability that the email mailbox resource will be accessed. Accordingly, mobile device 12 may be configured to display a graphical representation of the email mailbox resource in a prominent, easily accessible screen location at that time in the morning.

As another example, suppose that a user has been working on a particular document at various times throughout the day, and that the percentage of time spent accessing that particular document over the past week is relatively high, e.g., higher than most other resources. The context data would reflect that the document is accessed with a relatively high percentage of accesses, relative to other ones of resources 28. Therefore, mobile device 12 (or remote computing device 18) may determine that the particular document has a high probability of being accessed when the user begins to use mobile device 12.

Moreover, in some examples, control unit 50 may provide the ability to search resources stored by one or more of remote computing devices 10 and/or remote server devices 16. For example, control unit 50 may render a user interface for searching for a particular resource by keyword, contents of the resource, metadata for the resource such as update or save dates, location tags, or the like, or other search criteria. In this manner, a user may search for a resource stored by mobile device 12, one of remote computing devices 10, or one of remote server devices 16.

In general, values may be tracked for a variety of different context dimensions whenever one of resources 28 is accessed. As noted above, the various context dimensions may include a time of day of the access, an identity of a device used to access the resource, a frequency of access to the resource, other resources accessed in close temporal proximity to the resource, a geographic location of a user when the resource is accessed, or other such context dimensions. Accordingly, a current intersection of values of the various context dimensions may be used to determine a current context. The current context may further be used to determine which of resources 28 is likely to be accessed (that is, has a high probability of being accessed) in the near future, given the current context.

Context determination unit 60 of mobile device 12 represents an example of a unit of mobile device 12 for determining a current context, as well as for determining one or more of resources 28 that have a high probability of being accessed given the current context. For example, context determination unit 60 determines current values for the context dimensions, e.g., when mobile device 12 performs a login procedure with remote computing device 18 and/or periodically while connected to remote computing device 18.

In some examples, context requesting unit 62 requests context data from remote computing device 18. For example, context requesting unit 62 may construct a request for updated context data from remote computing device 18 that also specifies a timestamp of a most recent update from remote computing device 18. Other unique identifiers, rather than a timestamp, may also be used, such as a version number. In response to the request, context determination unit 60 receives aggregate context data having timestamps after the timestamp specified in the request (or other unique identifying information). In this manner, context requesting unit 62 may request only aggregate context data that has not yet been received, as well as remove antiquated aggregate context data. Context requesting unit 62 stores the aggregate context data in local data cache 66, in this example. Then, context processing unit 64 compares current values for one or more context dimensions to the updated aggregate context data stored in local data cache 66 to determine one or more of resources 28, maintained by remote computing device 18, that have a high probability of being accessed in the near future, based on the current context.

In other examples, context requesting unit 62 requests data representative of one or more of resources 28 that have a high probability of being accessed in the near future from remote computing device 18. In these examples, context requesting unit 62 forms a request that specifies the current context by specifying current values for the one or more context dimensions. In response to the request, context determination unit 60 receives information from remote computing device 18 indicative of one or more of resources 28 that have a high probability of being accessed in the near future.

In some examples, data retrieval unit 68 retrieves data for one or more of resources 28 that have a high probability of being accessed in the near future from remote computing device 18 via network interface 72. For example, data retrieval unit 68 may retrieve graphical representations of the one or more resources, such as icons and/or snapshots of the resources, from remote computing device 18. In addition, or in the alternative, data retrieval unit 68 may retrieve all or a portion of the resources themselves, such that if one or more of the resources are actually accessed via mobile device 12, the time to access the resource(s) is relatively short. Typically, data retrieval unit 68 would only retrieve data of the resources themselves for resources that can be accessed by native applications 52. Even if the resources are not accessed immediately, retrieving data for the resources themselves may still be advantageous if mobile device 12 needs to disconnect from remote computing device 18, e.g., due to entering airplane mode, losing a wireless signal, or otherwise not having an active network connection. Data retrieval unit 68 stores retrieved data in local data cache 66, which may be accessed by native applications 52, native application simulator 54, and/or user interface module 56.

Figure 4:
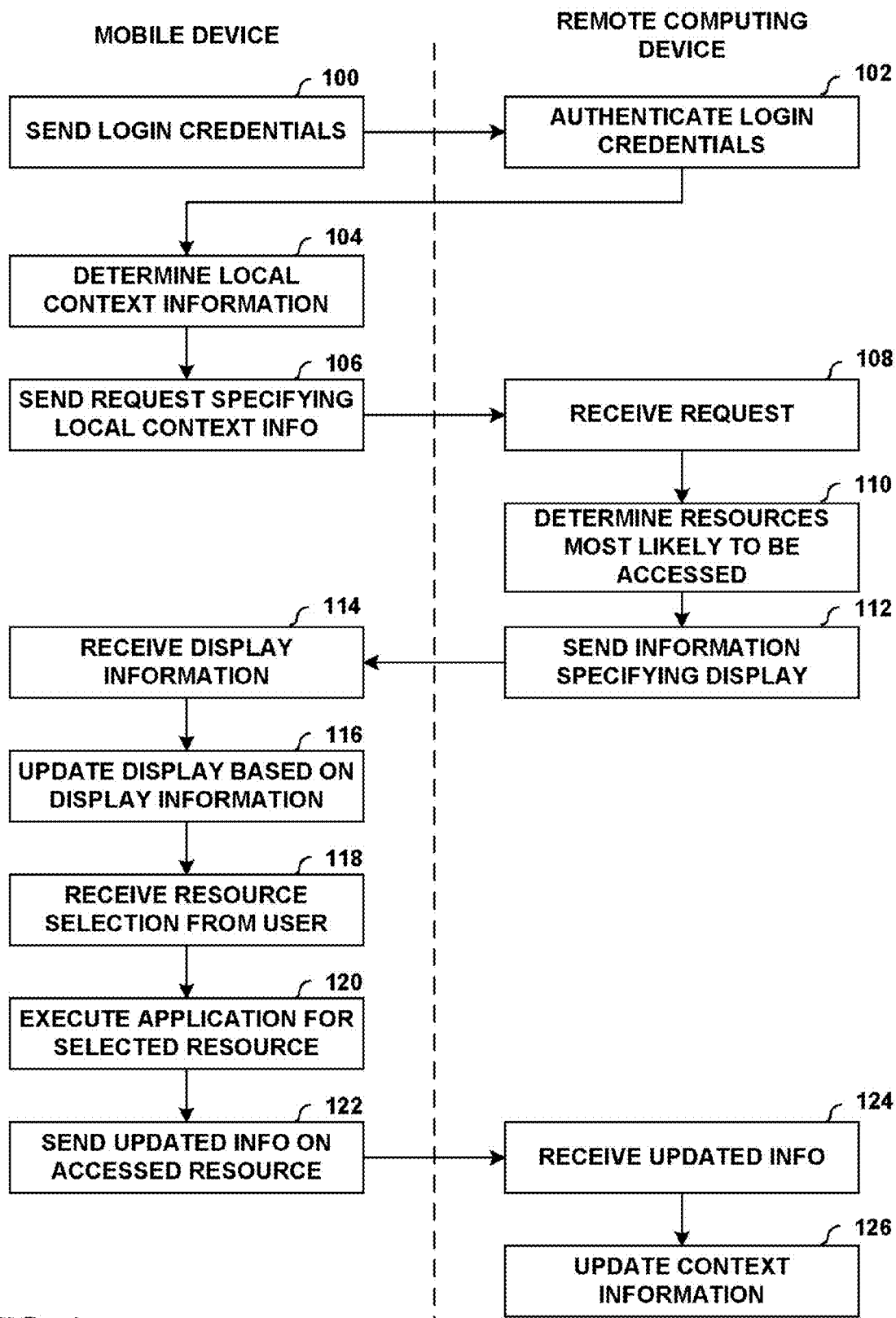
FIG. 4 is a flowchart illustrating an example method for determining a context for a mobile device.

FIG. 4 is a flowchart illustrating an example method for determining a context for a mobile device. The determined context generally causes the mobile device, such as mobile device 12, to present a display including graphical representations of resources that are determined to be likely to be accessed in the determined context. In this example, initially, mobile device 12 sends login credentials to remote computing device 18 (100). Remote computing device 18 then authenticates the login credentials from mobile device 12 (102).

Mobile device 12 next determines local context information (104). For example, mobile device 12 may determine values for one or more context dimensions, such as a current time of day, a geographic location, recently accessed resources, or the like. In this example, mobile device 12 sends a request specifying the local context information to remote computing device 18 (106).

In response to receiving the request (108), remote computing device 18 determines one or more resources that are most likely to be accessed (110). That is, remote computing device 18 determines one or more of resources 28 that are likely to be accessed by a user of mobile device 12 in the near future, based on the current context information specified in the received request. As discussed above, remote computing device 18 may make this determination based on historical accesses of the resources and values for the context dimensions when the resources were accessed.

For example, remote computing device 18 may calculate an aggregate score based on how well the current context, defined by the request from mobile device 12, matches historical contexts in which the resources were previously accessed. A relatively high aggregate score for a particular resource may indicate that the resource is commonly accessed in a context that is similar to the current context for mobile device 12. A relatively low aggregate score for a particular resource may, however, indicate that the resource is not typically accessed in a context that is similar to the current context for mobile device 12. Individual score values may be calculated for each of the context dimensions, e.g., based on a binary value (whether the current value for the dimension matches a value of the dimension for a particular resource) or a numeric value corresponding to how closely the current value for the context dimension matches a value of the dimension for a particular resource. As an example, remote computing device 18 may assign a binary value to a context dimension representative of an identifier of a device used to access a resource, whereas remote computing device 18 may assign a numeric value to a context dimension representative of a time of access to a particular resource. In this manner, if the current time value is 7:05 am, resources having common accesses at 7:00 am may receive a higher score for the time context dimension than resources having common accesses at 12:00 pm, as one example.

In any case, in the example of FIG. 4, remote computing device 18 uses the determination of resources having a high probability of being accessed in the near future to determine display information for mobile device 12. The display information generally defines a presentation of graphical representations of the resources by mobile device 12. For example, the display information may include icons for the resources determined to have a high probability of being accessed, as well as location information defining where the icons should be displayed on the screen. In some examples, the display information may further indicate that some icons should be displayed more prominently, e.g., at different sizes than other icons. For example, the display information may indicate that more likely resources should be displayed in a larger size whereas icons for relatively less likely resources should be displayed in a smaller size on the screen. In any case, in the example of FIG. 4, remote computing device 18 sends the information specifying the display to mobile device 12 (112).

In response to receiving the display information (114), mobile device 12 updates a current display based on the display information (116). For example, mobile device 12 may render an image including icons, a snapshot, or other graphical representation, for the most likely resources at positions on the screen as defined by the display information received from remote computing device 18. Likewise, if the display information specifies sizes for the icons, mobile device 12 may render the icons such that the sizes correspond to the sizes defined by the display information.

It should be understood that FIG. 4 represents merely one example, in which remote computing device 18 determines the most likely resources to be accessed and generates the display information accordingly. In other examples, mobile device 12 may be configured to determine which of the resources is most likely to be accessed in the near future. In such examples, mobile device 12 may perform a similar analysis to that performed by remote computing device 18 as described above. Moreover, in such examples, mobile device 12 may request context data from remote computing device 18 that provides indications of accesses to resources and values for one or more context dimensions at the time of the resource accesses. Also as noted above, mobile device 12 may request only new context data, e.g., context data occurring after a specified time, to avoid retrieving data that mobile device 12 has already received. In such examples, mobile device 12 may determine the graphical information, such as how to present graphical representations of the resources determined to have a high probability of being accessed in the near future.

In any case, after displaying graphical representations of the resources determined to have a high probability of being accessed, mobile device 12 may receive a selection of a resource to be accessed from a user (118). The selection may be a selection of one of the resources determined to be most likely, or a different resource. In any case, mobile device 12 may execute an application for the selected resource (120). As discussed in greater detail with respect to FIG. 7, in some examples, mobile device 12 may cause remote computing device 18 to execute one of applications 22 to access the resource, rather than executing one of native applications 52, such as when none of native applications 52 is capable of accessing the selected resource or when an application executed by remote computing device 18 is determined to be more appropriate.

In response to the access of the resource, mobile device 12 sends updated context information regarding the accessed resource to remote computing device 18 (122). For example, the updated information may include a current context in which the resource was accessed, which may be defined by values for one or more of the context dimensions at the time the selected resource was accessed. In response to receiving the updated context information from mobile device 12 (124), remote computing device 18 updates the context information (126), e.g., context data 36, to store a new entry in a table of accesses to resources and values for the one or more context dimensions when the resources are accessed.

In this manner, FIG. 4 represents an example of a method of determining one or more resources that have a high probability of being accessed. In this example, the method includes comparing current values for one or more context dimensions to data indicative of relationships between accesses to resources maintained by a remote computing device and values for the one or more context dimensions during the accesses. The method also includes determining one or more of the resources maintained by the remote computing device that have a high probability of being accessed based on the comparison. The method further includes causing a mobile device to obtain information indicative of the determined one or more resources based on the determination that the one or more resources have the high probability of being accessed. All or individual portions of this method may be performed by remote computing device 18 or mobile device 12, or other such devices.

Figure 5:
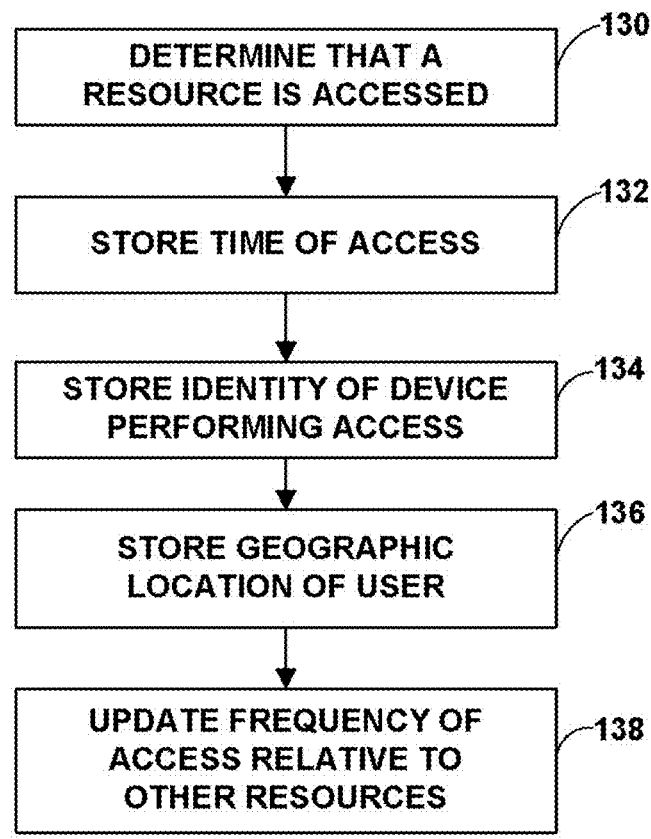
FIG. 5 is a flowchart illustrating an example method for updating context information associated with a resource.

FIG. 5 is a flowchart illustrating an example method for updating context information associated with a resource. In general, the method of FIG. 5 corresponds to steps 122-126 of the method of FIG. 4. In the example of FIG. 5, a device, such as remote computing device 18 or mobile device 12, determines that a resource is accessed (130). In response, the device stores a time of the access (132). The device also stores an identity of the device performing the access, e.g., one of mobile device 12 or remote computing device 18 (134). The device may also store other metadata, such as an identifier for the resource being accessed. In some examples, when mobile device 12 initiates an access to a resource, but causes remote computing device 18 to execute one of applications 22 to access the resource, the stored identity may correspond to mobile device 12 because mobile device 12 initiated the access.

The device further stores a geographic location of a user at the time of the access (136), which may be based in part on the identity of the device used to access the resource. For example, if the user uses remote computing device 18 to access the resource, the device stores a geographic location of remote computing device 18. On the other hand, if the user uses mobile device 12 to access the resource, mobile device 12 may determine its current geographic location using a global positioning system (GPS) receiver of mobile device 12. In the example of FIG. 5, the device further updates a frequency of access of the resource, relative to other resources (138). The frequency of access may correspond to a raw number of times the resource has been accessed over a period of time or over a number of accesses, or a percentage of times the resource has been accessed over a period of time or over a number of total resource accesses.

In this manner, the method of FIG. 5 may be used to maintain historical data, e.g., context data 36, representative of accesses to resources 28 maintained by remote computing device 18. The data also represents values for one or more context dimensions at times when resources are accessed. In this manner, the context data can be used for subsequent analysis, such as described with respect to FIG. 6, to determine resources that are most likely to be accessed (that is, have a high probability of being accessed) in a particular context.

Figure 6:
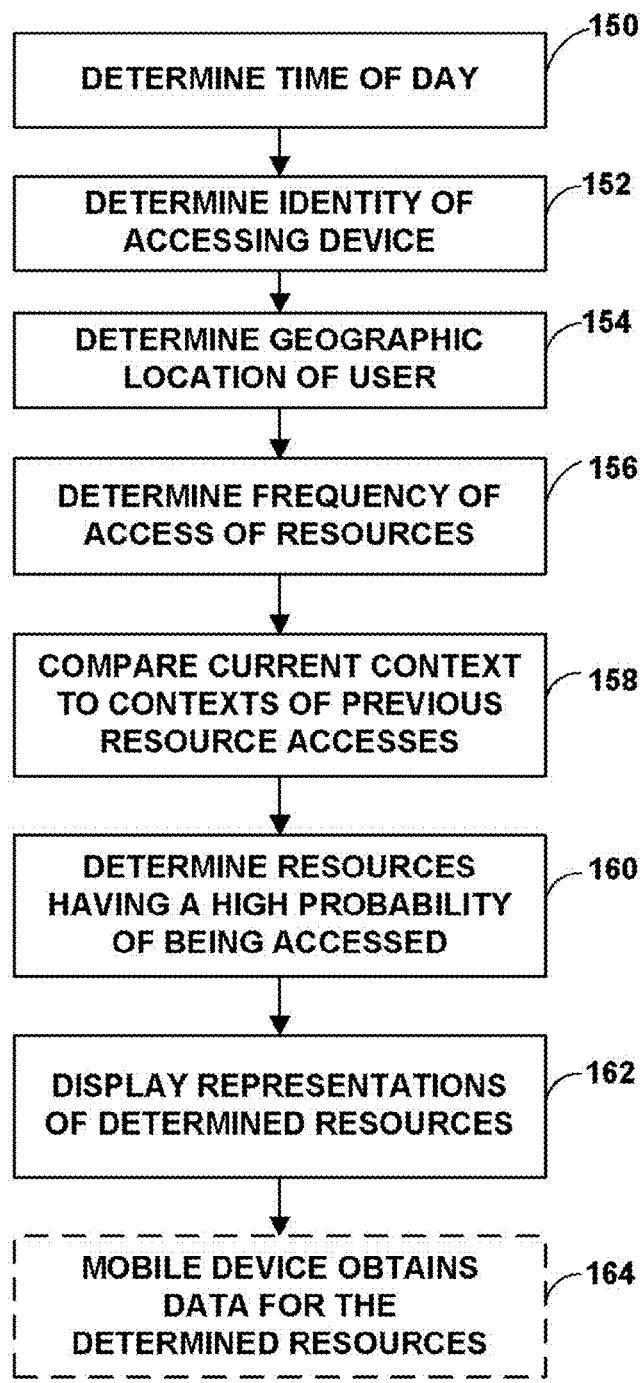
FIG. 6 is a flowchart illustrating an example method for using current context information to determine one or more resources having a high probability of being accessed.

FIG. 6 is a flowchart illustrating an example method for using current context information to determine one or more resources having a high probability of being accessed. The method of FIG. 6 may generally correspond to steps 106-116 of FIG. 4. In the example of FIG. 6, a device, such as mobile device 12 or remote computing device 18, determines a current time of day (150). The device also determines an identity of the accessing device, which again, may be mobile device 12, remote computing device 18, or another such device (152). The device may determine a geographic location of the user (154), which, as with step (136) of FIG. 5, may be performed based on the identity of the device. Whereas remote computing device 18 may have a fixed location, assuming for purposes of discussion that remote computing device 18 is a desktop, server, or other relatively stationary device, mobile device 12 may determine its location using a GPS unit.

The device may further determine frequency of accesses of various resources, e.g., based on the determined values of the time of day, the identity of the accessing device, and the geographic location, universally without consideration of these values, or both (156). The combination of values for these various context dimensions may represent a current context for the device that is to be used to access a resource. The device may further compare the current context to contexts of previous resource accesses (158). That is, the device may compare current values for one or more context dimensions to data indicative of relationships between accesses to resources maintained by remote computing device 18 and values for the one or more context dimensions during the accesses. In this manner, the device may determine one or more of the resources that have a high probability of being accessed in the near future (160), based on historical resource access information as gathered via the method of FIG. 5.

In addition, the device may display representations of the determined resources (162). For example, the device may display graphical representations, such as icons, snapshots, or other representations of the resources, such that the display is defined according to the probabilities that the resources will be accessed in the near future. That is, representations of resources having a relatively higher probability of being accessed may be displayed more prominently than representations of resources having a relatively lower probability of being accessed. Assuming in one example that the device is mobile device 12, mobile device 12 may further obtain data for the determined resources (164). For example, mobile device 12 may request data for the resources determined to have a high probability of being accessed, or remote computing device 18 may send data for the resources to mobile device 12.

In this manner, FIG. 6 represents an example of a method of determining one or more resources that have a high probability of being accessed. In this example, the method includes comparing current values for one or more context dimensions to data indicative of relationships between accesses to resources maintained by a remote computing device and values for the one or more context dimensions during the accesses. The method also includes determining one or more of the resources maintained by the remote computing device that have a high probability of being accessed based on the comparison. The method further includes causing a mobile device to obtain information indicative of the determined one or more resources based on the determination that the one or more resources have the high probability of being accessed. All or individual portions of this method may be performed by remote computing device 18 or mobile device 12, or other such devices.

Figure 7:
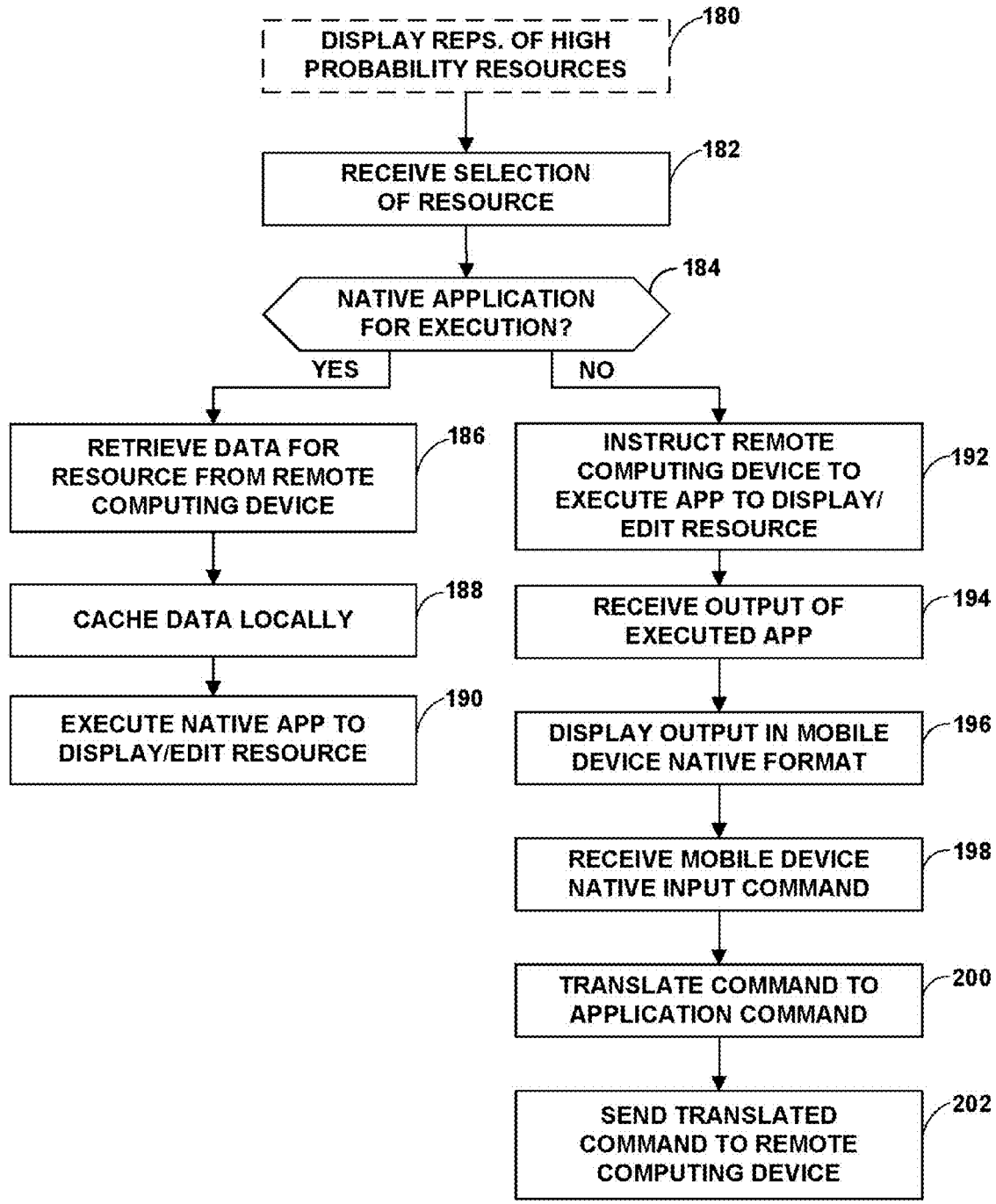
FIG. 7 is a flowchart illustrating an example method for presenting execution of an application on a mobile device in a native mobile device format.

FIG. 7 is a flowchart illustrating an example method for presenting execution of an application on a mobile device in a native mobile device format. That is, the method of FIG. 5 generally allows for presentation of execution of an application regardless of whether a native, mobile device application is executed or an application is executed remotely by a computing device. The method of FIG. 7 is described with respect to mobile device 12 for purposes of example and explanation, although other mobile devices may also be configured to perform this or similar methods.

Initially, mobile device 12 may display graphical representations of high probability resources, that is, resources having a high probability of being accessed in the near future (180). Step (180) of the method of FIG. 7 may correspond to step 116 of FIG. 4 or step 162 of FIG. 6. In any case, mobile device 12 may receive a selection of a resource from a user (182). The selected resource need not have been one of the resources determined to have a high probability of being accessed. Although not shown in FIG. 7, mobile device 12 may cause context data for the selected resource to be updated based on the selection, e.g., as discussed with respect to FIG. 5.

In any case, mobile device 12 may determine whether one of native applications 52 is capable of accessing the selected resource (184). For example, mobile device 12 may analyze a file extension or file type associated with the resource, and determine whether any of native applications 52 is associated with the file extension or file type of the resource. If one of native applications 52 is capable of (and in some examples, more desirable than an application executed by the remote computing device for) accessing the resource ("YES" branch of 184), mobile device 12 retrieves data for the resource from remote computing device 18 (186). Mobile device 12 furthers cache the data for the resource locally, e.g., within local data cache 66 (188). Furthermore, mobile device 12 executes the one of native applications 52 to display, edit, or otherwise interact with the selected resource (190).

On the other hand, if none of native applications 52 is capable of accessing the resource ("NO" branch of 184), mobile device 12 instructs remote computing device 18 to execute one of applications 22 in order to display, edit, or otherwise interact with the selected resource (192). Mobile device 12 also receives output of the executed one of applications 22 during execution of the one of applications 22 (194). The output generally corresponds to graphical output intended for a display local to remote computing device 18. However, mobile device 12 displays the output in a mobile device native format (196). That is, mobile device 12 displays the output in a format that is optimized for mobile device 12. For example, mobile device 12 may ensure that the actual display corresponds to various defined output schemas, e.g., regarding whether to display the output in a window or full screen, text formatting such as text size and font correspond to a text schema for mobile device 12, a color palette corresponds to a color scheme for mobile device 12, or other such output format concerns.

As noted above, mobile device 12 also provides input mechanisms not generally supported by applications 22. For example, mobile device 12 provides support for touch-based input, such as multitouch input, which is considered one example of mobile device native input commands. As another example, a user may utilize an element of mobile device 12 for input, such as capturing an image via a camera of mobile device 12 or receiving geographic information via a GPS unit of mobile device 12. These inputs are considered another example of mobile device specific native input commands. Mobile device 12 may also display graphical user interface elements during execution of the one of applications 22 that is not generated as part of the output from execution of the one of applications 22. Accordingly, selection of one of these graphical user interface elements is further considered an example of a mobile device native input command. In any case, mobile device 12 may receive a mobile device native input command (198), such as one of those discussed above or other such mobile device specific input commands.

In response to such a command, mobile device 12 translates the command to an application command (200). Likewise, mobile device 12 sends the translated command to remote computing device 18 (202). For example, mobile device 12 translates touch-based input and multitouch input to commands for interacting with the application or an operating system of remote computing device 18. Thus, if a user provides a pinch-zoom command when mobile device 12 is displaying output resulting from execution of a word processing document, only the text field used to view and edit text of a text document resource would be zoomed, as opposed to zooming the entire displayed application including graphical user interface elements of the graphical user interface of the one of applications 22. As another example, if the user captures an image using a camera of mobile device 12, mobile device 12 may send the image to a clipboard of the application or the operating system executed by remote computing device 18, or other destinations, such as to the application itself as executed by remote computing device 18.

In this manner, the method of FIG. 7 represents an example of a method for ensuring a consistent user experience whether mobile device 12 executes one of native applications 52 or whether mobile device 12 causes remote computing device 18 to execute one of applications 22. The method includes issuing, by a mobile device, a request to access a resource maintained by a remote computing device, wherein the request causes the remote computing device to execute an application to access the resource. The method also includes receiving information corresponding to graphical output resulting from execution of the application to access the resource from the remote computing device, wherein the graphical output corresponds to a format specific to the remote computing device. The method further includes presenting a graphical representation of the received information in an output format optimized for the mobile device. Likewise, the method includes receiving an input command in an input format specific to the mobile device, wherein the input command comprises a command for interacting with the application. The method also includes translating the input command to a format specific to the application executed by the remote computing device and sending the translated command to the remote computing device.

Figure 8:
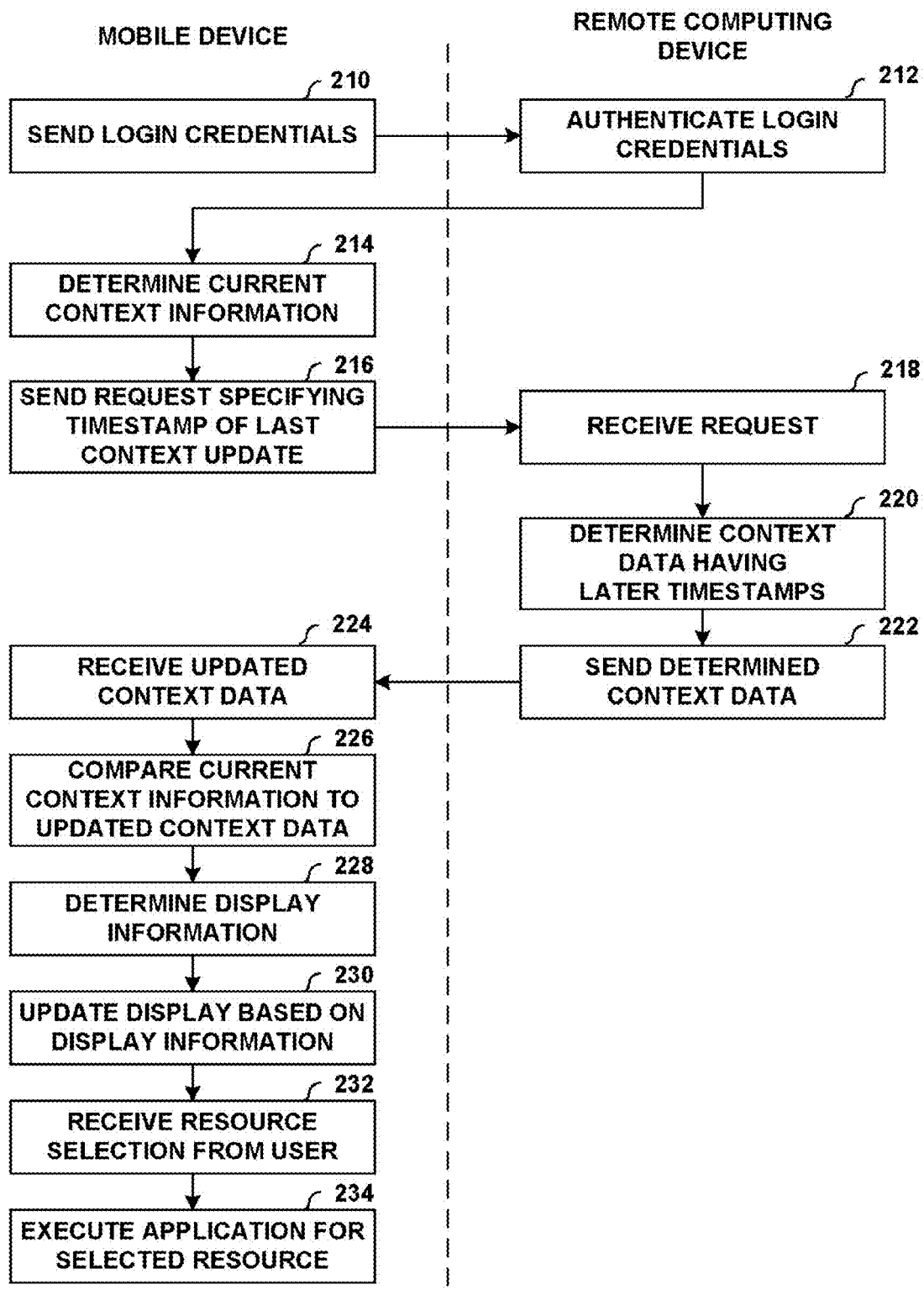
FIG. 8 is a flowchart illustrating an alternative example for determining a context for a mobile device.

FIG. 8 is a flowchart illustrating an alternative example for determining a context for a mobile device. Whereas FIG. 4 illustrates an example in which remote computing device 18 determines resources that have high probabilities of being accessed, FIG. 8 represents an example in which mobile device 12 determines resources that have high probabilities of being accessed. The determined context generally causes the mobile device, such as mobile device 12, to present a display including graphical representations of resources that are determined to be likely to be accessed in the determined context. In this example, initially, mobile device 12 sends login credentials to remote computing device 18 (210). Remote computing device 18 then authenticates the login credentials from mobile device 12 (212). Mobile device 12 also determines current context information (214). For example, mobile device 12 may determine values for one or more context dimensions, such as a current time of day, a geographic location, recently accessed resources, or the like.

In this example, mobile device 12 maintains context data in local data cache 66. The context data includes timestamps for entries corresponding to accesses of the resources and values for the one or more context dimensions. To avoid retrieving context data that has already been received, mobile device 12 sends a request specifying a timestamp of a last context update to remote computing device 18 (216). In response to receiving the request (218), remote computing device 18 determines entries of context data 36 that have timestamps later than the timestamp specified in the request (220). Then, remote computing device 18 sends the determined context data to mobile device 12 (222).

Mobile device 12 subsequently receives the updated context data from remote computing device 18 (224). As noted above, in the example of FIG. 8, mobile device 12 determines ones of resources 28 maintained by remote computing device 18 that have a high probability of being accessed in the near future. To do so, mobile device 12 compares the current context information to the updated context data (226). This comparison generally indicates resources that have been recently and/or frequently accessed in contexts similar to the current context determined at step (214). Those resources that are recently and/or frequently accessed in contexts similar to the current context are said to have a high probability of being accessed in the near future.

Using the resources determined to have a high probability of being accessed, mobile device 12 determines display information for these resources (228). The display information may correspond to positions and/or sizes of icons for resources determined to have a high probability of being accessed. Mobile device 12 may update a display based on the determined display information (230). In addition, mobile device 12 may receive a resource selection from a user (232) and execute an application to access the selected resource (234). Although not shown in FIG. 8, the method may further include updating the context information based on the selected resource that was accessed.

In this manner, both FIG. 4 and FIG. 8 represent examples of methods including comparing current values for one or more context dimensions to data indicative of relationships between accesses to resources maintained by a remote computing device and values for the one or more context dimensions during the accesses, determining one or more of the resources maintained by the remote computing device that have a high probability of being accessed based on the comparison, and causing a mobile device to obtain information indicative of the determined one or more resources based on the determination that the one or more resources have the high probability of being accessed.

In particular, causing a mobile device to obtain information for one or more resources determined to have a high probability of being accessed may be performed either by mobile device 12 or by remote computing device 18. That is, in some examples, remote computing device 18 sends information for the one or more resources to mobile device 12, which causes mobile device 12 to obtain the information. In other examples, mobile device 12 requests the information from remote computing device 18, which also causes mobile device 12 to obtain the information. As noted above, the obtained information may include graphical representations of the resources, such as icons or snapshots of the resources, or all or a portion of the data for the resources themselves.

Figure 9:
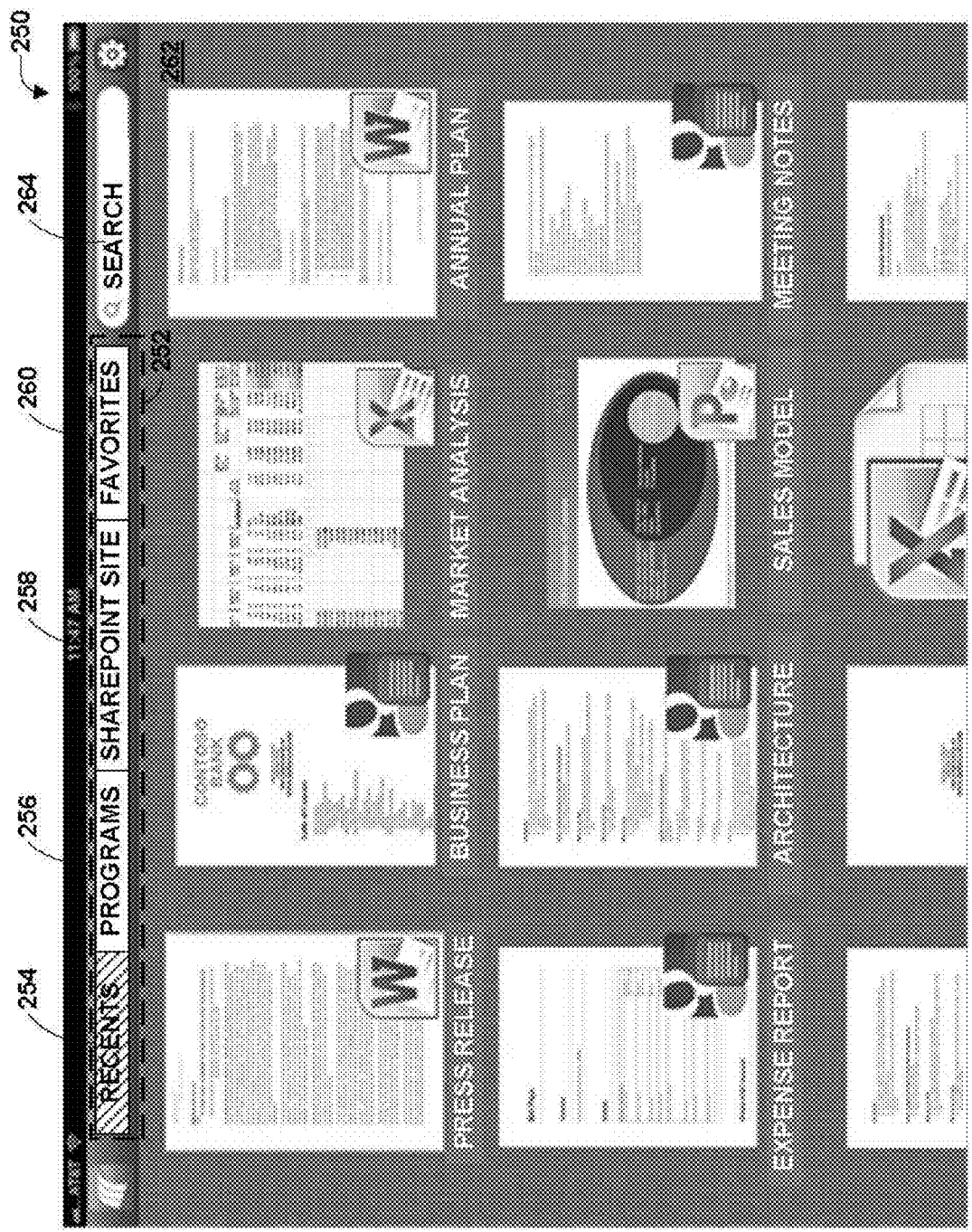
FIG. 9 is a screenshot illustrating an example graphical user interface for the techniques of this disclosure.

FIG. 9 is a screenshot illustrating an example graphical user interface 250 for the techniques of this disclosure. Graphical user interface 250 may be described as a "home screen," in that a similar user interface may be initially displayed when an application implementing the techniques of this disclosure is executed. Mobile device 12, for example, may present a user interface similar to graphical user interface 250 to allow a user to select a resource. In this example, graphical user interface 250 presents a menu bar 252, including Recents button 254, Programs button 256, Sharepoint Site button 258, and Favorites button 260. Recents button 254 is shaded in this example, indicating that Recents button 254 has been selected. When a user selects one of Recents button 254, Programs button 256, Sharepoint Site button 258, and Favorites button 260 (a default one of which may be pre-selected when a user navigates to the home screen), graphical elements representative of resources corresponding to the selected button may be shown in field 262. In this example, field 262 displays previews and names for resources that have recently been opened.

The home screen, as shown in the example of FIG. 9, is generally a dashboard of documents and applications from all data and application silos, such as resources maintained by remote computing devices 10, stored by any or all of remote computing devices 10 and/or remote server devices 16. As shown in this example, each resource (e.g., each document) has a preview tile to help identify it, regardless of whether it is a Box.net file, a Salesforce record, a document stored in SharePoint, or other resource stored elsewhere. In this example, the home screen is organized to highlight items recently used by a worker from their PC or mobile device. This may assist a user in the ability to pick up where they left off from their desk. Users can use unified full-text search and browse capabilities across everything, in case they need something they can't find here, e.g., using search box 264. From the screen shown in FIG. 9, a user may select a resource to launch execution of an application for interacting with the resource, as described in greater detail below with respect to FIGS. 10-14.

Figure 10:
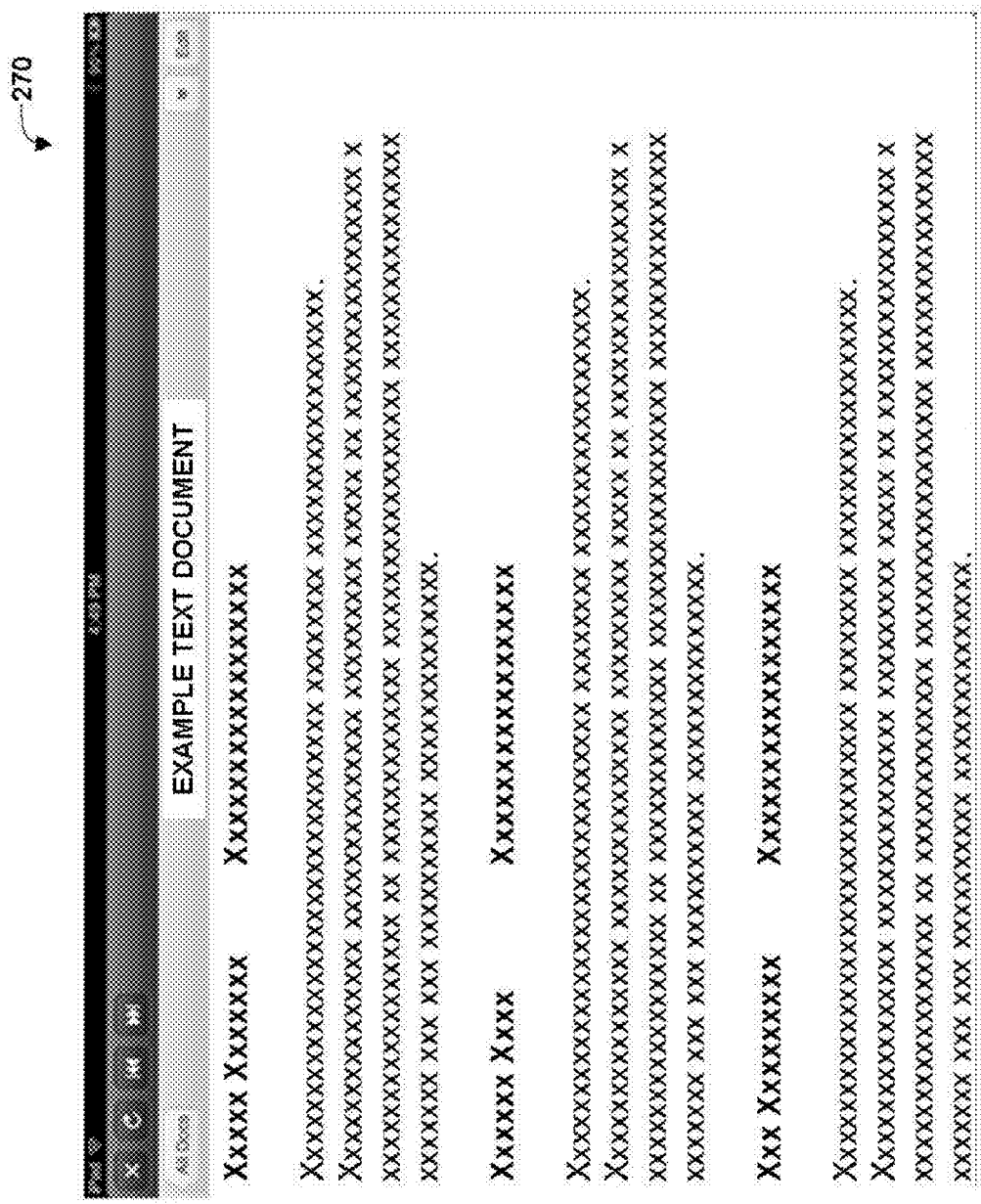
FIG. 10 is a screenshot illustrating an example graphical user interface showing output for a text-based resource.

FIG. 10 is a screenshot illustrating an example graphical user interface 270 showing output for a text-based resource. For example, a user may select a text-based resource from graphical user interface 250 of FIG. 9, which may cause mobile device 12 to display graphical user interface 270, showing output of an application that opens the selected resource. The application may be executed locally by mobile device 12, or remotely by one of remote computing devices 10 or one of remote server devices 16. Data for the resource may be cached locally by mobile device 12, or stored by one of remote computing devices 10 or one of remote server devices 16.

In this manner, with one touch, a user can open a document, sales record, or other item or resource hosted on a cloud service like Box.net, Google Docs, and/or Salesforce.com. Mobile device 12 may open a viewer and editor for the document, such as graphical user interface 270. This viewer is a native application for mobile device 12 (such as a native browser for an iPad), so viewing, scrolling, and editing are natively handled by mobile device 12, and may be incredibly responsive.

Figure 11:
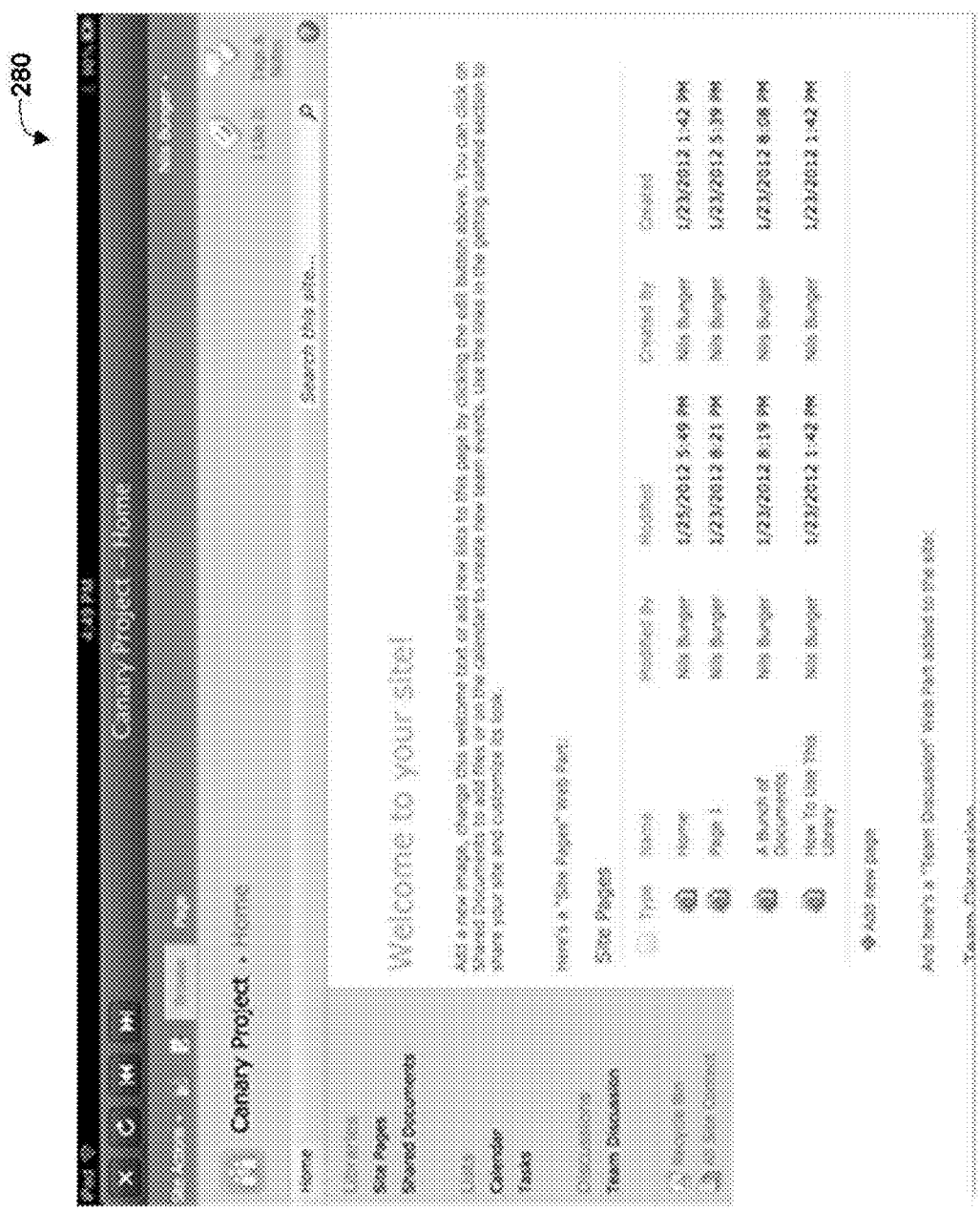
FIG. 11 is a screenshot illustrating an example graphical user interface showing output for an Intranet web page.

FIG. 11 is a screenshot illustrating an example graphical user interface 280 showing output for an Intranet web page. For example, a user may select an Intranet web page resource from graphical user interface 250 of FIG. 9, which may cause mobile device 12 to display graphical user interface 280, showing output of an application that opens the selected web page. In this manner, with one touch, a user can open a page from a SharePoint site. Mobile device 12 may render the page in a native browser (such as an iPad-native browser), so viewing, scrolling, and editing are natively handled by mobile device 12 and may be incredibly responsive. Even if the site is only available on the intranet, mobile device 12 may render the page in its native browser.

Figure 12:
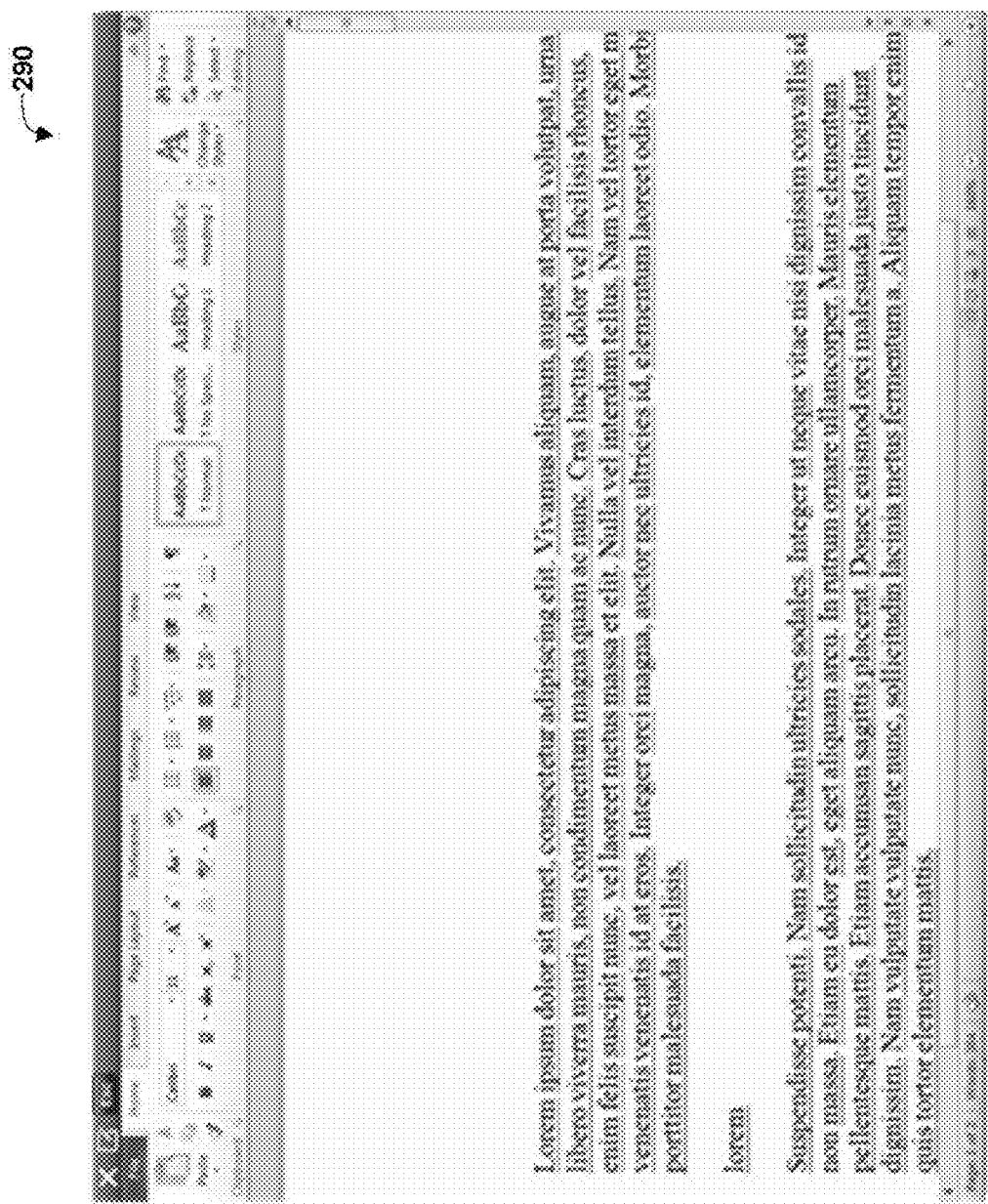
FIG. 12 is a screenshot illustrating an example graphical user interface showing output for a text-based resource formatted according to Microsoft Word.

FIG. 12 is a screenshot illustrating an example graphical user interface 290 showing output for a text-based resource formatted according to Microsoft Word. Mobile device 12 may not include an application corresponding to Microsoft Word, or may determine that a version of Microsoft Word executed by one of remote computing devices 10 is preferable over a local application for opening Microsoft Word documents. In accordance with the techniques of this disclosure, mobile device 12 may cause one of remote computing devices 10 to execute Microsoft Word to interact with the document, and mobile device 12 may display graphical output, e.g., in the form of graphical user interface 290.

In this manner, a user can open a Microsoft Word or PowerPoint document from any of the available data sources, e.g., remote computing devices 10 and/or remote server devices 16. Mobile device 12 may open a full-screen view of the application, screencast from the device executing the application, e.g., a device of an enterprise. The user can view and edit the document locally on mobile device 12. Input specific to mobile device 12, such as native gestures like swiping to scroll, and pinch&zoom, work as expected by the user. That is, mobile device 12 may convert commands received in a format specific to mobile device 12 into proper corresponding commands for the application being executed by the remote computing device.

Figure 13:
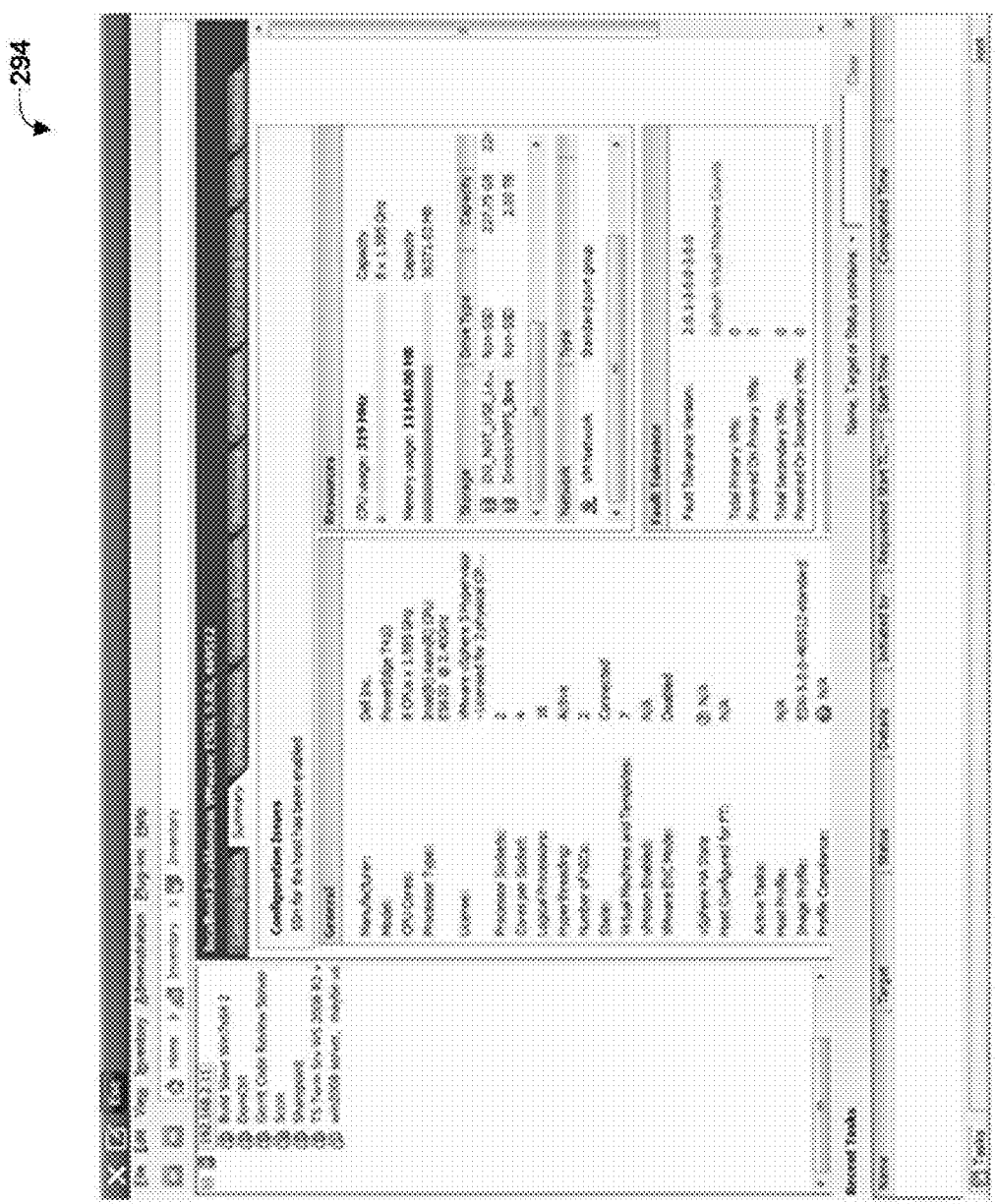
FIG. 13 is a screenshot illustrating another example graphical user interface.

FIG. 13 is a screenshot illustrating another example graphical user interface 294. Other applications (such as other applications implemented for Windows, Mac OS, Linux, Unix, or other operating systems) may be viewed in the same way as the example of the Microsoft Word application described with respect to FIG. 12. For example, as shown in the example of FIG. 13, a user can screencast VMware's vSphere Client for managing virtual infrastructure.

Figure 14:
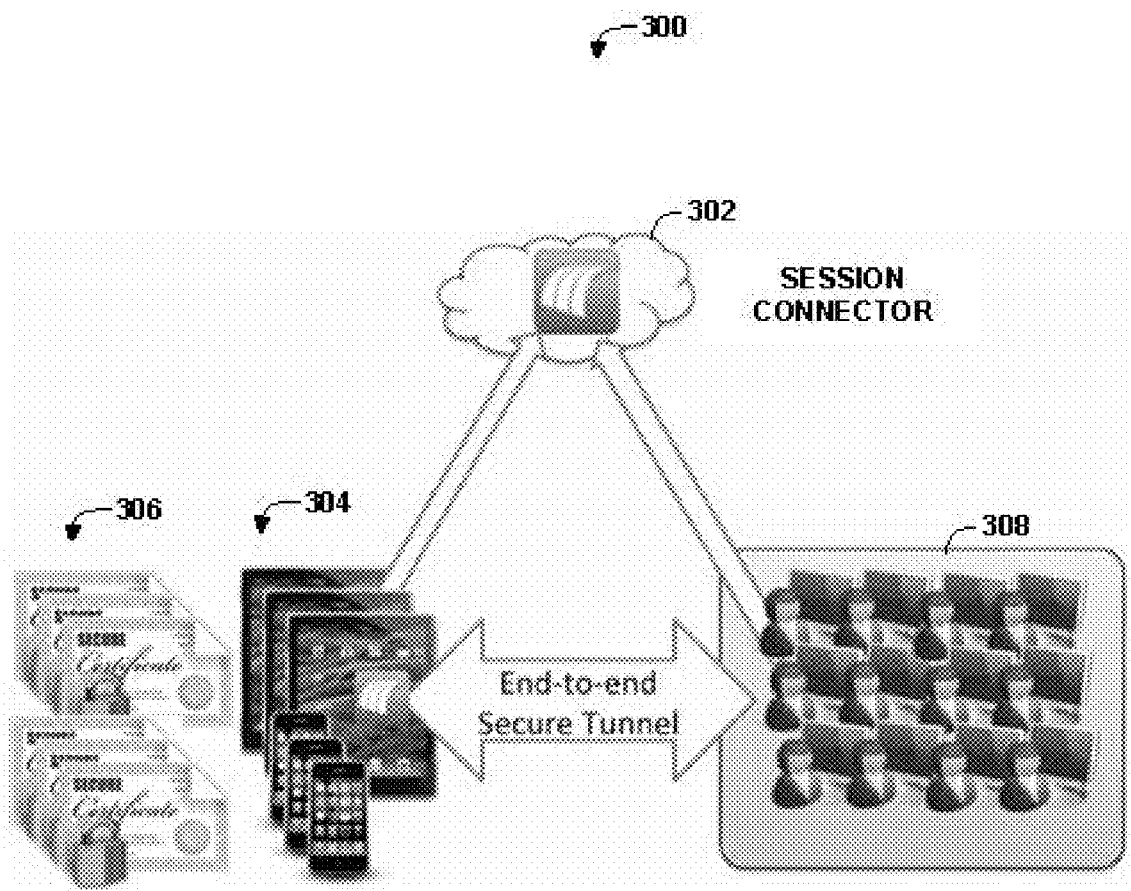
FIG. 14 is a conceptual diagram illustrating components of an example system implementing the techniques of this disclosure.

FIG. 14 is a conceptual diagram illustrating components of an example system 300 implementing the techniques of this disclosure. In this example, system 300 includes enterprise 308, which includes one or more remote computing devices that maintain resources, as well as mobile devices 304 and a cloud-based session connector 302. Session connector 302 may be implemented as one or more computing devices. In some examples, session connector 302 may be realized as a MobileSpan Session Connector cloud-based service. Session connector 302 may assist in session establishment between mobile devices 304 and computing devices within enterprise 308. For example, session connector 302 may help a PC inside enterprise 308 and an authorized one of mobile devices 304 to find each other and to negotiate a secure end-to-end encrypted tunnel. When possible, this tunnel may be created directly between the PC and the mobile device. Otherwise, session connector 302 may act as a data relay of encrypted data.

Device and user authentication for mobile devices 304 and users thereof may be handled by normal on-premises infrastructure, e.g., authentication devices of enterprise 308. As discussed above, enterprise 308 may issue SSL certificates 306 to mobile devices 304 for authenticating mobile devices 304 to enterprise 308. Data exchanged over the end-to-end secure tunnel may be encrypted between the PC and the mobile device, and thus, not visible to session connector 302 or anyone else.

In addition, mobile devices 304 may be configured to interact with cloud-based resources, such as Google Docs, Box.net, Salesforce, and other SaaS (software as a service) applications. Mobile devices 304 and devices of enterprise 308 may be configured to prevent documents from being moved between enterprise 308 and cloud sources, or to selectively enable such movement of resources. In this manner, IT administrators may have fine granularity of control to enable or disable cloud services, as well as to monitor usage of the services. Mobile devices 304 may intermingle resources stored and maintained by both cloud services and enterprise 308 automatically. Moreover, mobile devices 304 may allow users to perform full text searching across cloud-based services and enterprise 308.

Figure 15:
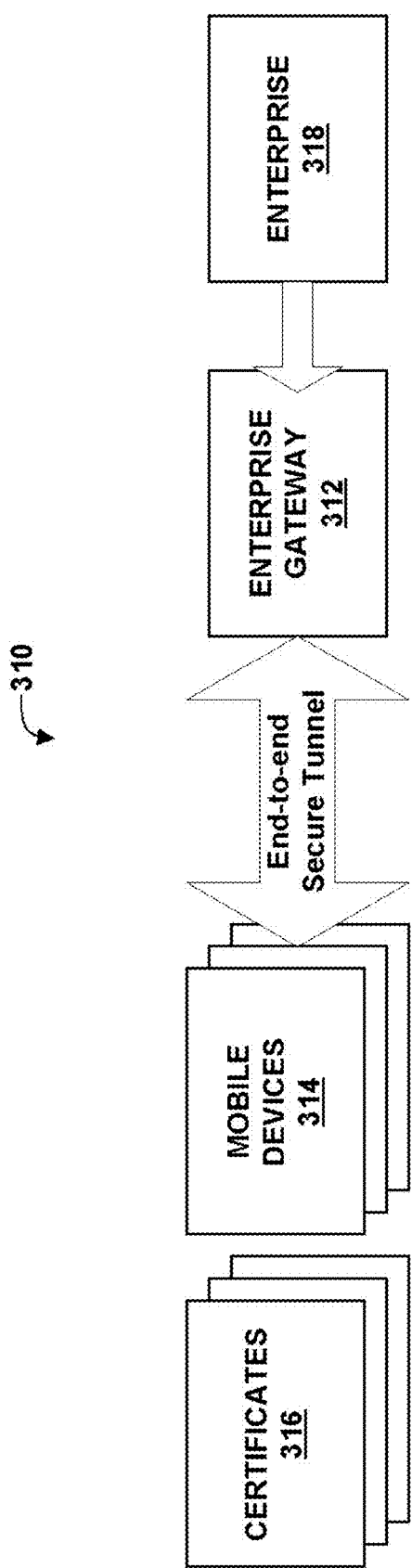
FIG. 15 is a conceptual diagram illustrating components of another example system implementing the techniques of this disclosure.

FIG. 15 is a block diagram illustrating components of another example system 310 implementing the techniques of this disclosure. In general, system 310 corresponds substantially to system 300 of FIG. 14. However, in this example, system 310 additionally includes an enterprise gateway 312 that provides a demilitarized zone (DMZ). Enterprise gateway 312 may correspond to a Windows application executed by a Windows server. Enterprise gateway 312 may enable two-factor authentication and centralization of SSL certificate management, e.g., for issuing SSL certificates 316 to mobile devices 314. In some examples, enterprise gateway 312 only requires an HTTPS port to be opened to the Internet (port 443 by default).

The Windows server implementing enterprise gateway 312 may handle client certificate authentication without external software, so that the server controls security for enterprise 308. Thus, enterprise gateway 312 may gather credentials from a user and authenticate the user against the enterprise LDAP, AD, or RADIUS server, which may be provided within enterprise 318. In this manner, enterprise gateway 312 may ensure that no data passes to the intranet of enterprise 308 until a device and user are fully authenticated. User authentication may even include a second-factor, such as an RSA token. No port needs to be opened between the intranet and DMZ. The example of system 310 may provide a high-security solution for enabling a mobile workforce, without any reliance on cloud components.

In some examples, an enterprise may deploy these techniques on existing servers, such as Citrix or Terminal Services servers. This may eliminate dependence on workers'PCs, except for documents or applications that only exist on those PCs. This can be done in addition to, or instead of, installation on user's PCs.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising:
   obtaining for each non-executable data resource of a set of non-executable data resources stored on a remote computing device one or more predetermined values associated with a user for one or more context dimensions, each context dimension identifying a circumstance of a previous access to a particular non-executable data resource stored on the remote computing device, each predetermined value being calculated based on one or more then-current values for the one or more context dimensions when the user previously accessed the particular non-executable data resource of the set of non-executable data resources;
   determining, when the user is using a mobile device, current values for the one or more context dimensions;
   comparing the current values for the one or more context dimensions to the predetermined values for the one or more context dimensions;
   determining scores for each of the one or more context dimensions based on the comparison, where the scores indicate how close the current values are to the predetermined values for each of the one or more context dimensions, including comparing a current time of day to a previous time of day when the particular non-executable data resource was previously accessed by the user;
   determining, based on the scores, a subset of the set of non-executable data resources that have a high probability of being accessed by the user from the mobile device;
   obtaining by the mobile device information indicative of the subset of the set of non-executable data resources;
   presenting on the mobile device, using the information, a user interface with a link to access each non-executable data resource of the subset of the set of non-executable data resources;
   receiving a selection of a particular link to a particular non-executable data resource of the subset of the set of non-executable data resources; and
   in response to the selection of the particular link to the particular non-executable data resource of the subset of the set of non-executable data resources, determining whether one of the plurality of native applications is associated with the particular non-executable data resource associated with the particular link, and when at least one of the plurality of native applications is associated with the particular non-executable data resource associated with the particular link, executing instructions for the at least one of the plurality of native applications to access the particular non-executable data resource associated with the particular link, and when none of the plurality of native applications is associated with the particular non-executable data resource associated with the particular link, execute the instructions for a native application simulator to access the particular non-executable data resource associated with the particular link,
wherein the native application simulator intercepts specific input commands and translates the specific input commands to analogous commands of an application associated with the particular non-executable data resource.

2. The method of claim 1, wherein the information comprises graphical representations, wherein the graphical representations comprise at least one of icons.

3. The method of claim 1, wherein the information indicates at least one of screen sizes and screen positions.

4. The method of claim 1, wherein comparing comprises comparing by the mobile device, wherein determining comprises determining by the mobile device, and wherein obtaining by the mobile device the information comprises requesting by the mobile device the information from the remote computing device.

5. The method of claim 1, wherein comparing comprises comparing by the remote computing device, wherein determining comprises determining by the remote computing device, and wherein obtaining by the mobile device the information comprises sending by the remote computing device the information to the mobile device.

6. The method of claim 5, further comprising receiving by the remote computing device a request for the information from the mobile device, wherein the request specifies the current values for the one or more context dimensions.

7. The method of claim 5, further comprising sending one or more instructions to the mobile device to cause the mobile device to display graphical representations of the subset of the set of non-executable data resources.

8. The method of claim 5, further comprising sending data from the subset of the set of non-executable data resources to the mobile device without a request for the data from the mobile device.

9. The method of claim 5, further comprising:
executing by the remote computing device the application;
determining new values for the one or more context dimensions at a time corresponding to execution of the application; and
updating the predetermined values associated with the user for the one or more context dimensions using the new values.

10. The method of claim 1, wherein the one or more context dimensions comprise one or more of geographic locations of devices used by the user to access the non-executable data resources, times at which the non-executable data resources are accessed by the user, relative frequencies of access by the user of the non-executable data resources, relative percentages of access by the user of the non-executable data resources, patterns of access by the user, other user accesses, most recent modification time, and indications of groups of the non-executable data resources that are accessed by the user in close temporal proximity.

11. The method of claim 1, wherein the one or more context dimensions includes frequency of access by the user to each non-executable data resource, and further comprising calculating the frequency of access by the user to each non-executable data resource based on at least one of a number of accesses by the user to the non-executable data resource over a period of time and a percentage of accesses by the user of the non-executable data resource over the period of time.

12. The method of claim 1, wherein determining the subset of the set of non-executable data resources comprises:
calculating a probability of each non-executable data resource of the set of non-executable data resources being accessed by the user; and determining that the probability exceeds a threshold.

13. The method of claim 1, wherein determining the subset of the set of non-executable data resources comprises:
calculating a probability of each non-executable data resource of the set of non-executable data resources being accessed by the user; and
determining when the probabilities calculated for the subset exceed the probabilities calculated for the non-executable data resources not in the subset.

14. The method of claim 1, further comprising:
receiving, by the mobile device, the selection of the particular link to the particular non-executable data resource of the subset of the set of non-executable data resources; and
presenting, by the mobile device, a graphical user interface (GUI) for displaying output resulting from execution of the application associated with the particular non-executable data resource associated with the particular link.

15. The method of claim 1, wherein accessing the particular non-executable data resource associated with the particular link comprises one of executing the application on the mobile device or causing a remote computing device to execute the application.

16. The method of claim 1, wherein the application associated with the particular non-executable data resource associated with the particular link comprises an application for modifying the particular non-executable data resource.

17. The method of claim 1, wherein the set of non-executable data resources is maintained by a remote computing device.

18. The method of claim 1, wherein the predetermined values for the one or more context dimensions comprise then-current values for the one or more context dimensions during previous accesses and during previous saves by the user of the subset of the set of non-executable data resources.

19. The method of claim 1, wherein determining current values for the one or more context dimensions, including one or more of identity of accessing device, geographic location of the user, and frequency of access of resources.

20. A device comprising:
one or more processors configured to:
obtain for each non-executable data resource of a set of non-executable data resources stored on a remote computing device one or more predetermined values associated with a user for one or more context dimensions, each context dimension identifying a circumstance of a previous access to a particular non-executable data resource stored on the remote computing device, each predetermined value being calculated based on one or more then-current values for the one or more context dimensions when the user previously accessed the particular non-executable data resource of the set of non-executable data resources;
determine, when the user is using a mobile device, current values for the one or more context dimensions;

compare the current values for the one or more context dimensions to the predetermined values for the one or more context dimensions;

determine scores for each of the one or more context dimensions based on the comparison, where the scores indicate how close the current values are to the predetermined values for each of the one or more context dimensions, including comparing a current time of day to a previous time of day when the particular non-executable data resource was previously accessed by the user;

determine, based on the scores, a subset of the set of non-executable data resources that have a high probability of being accessed by the user; and a network interface configured to cause the mobile device to obtain information indicative of the subset of the set of non-executable data resources, wherein the one or more processors are configured to cause the mobile device to:

present, using the information, a user interface with a link to access each non-executable data resource of the set of non-executable data resources;

receive a selection of a particular link to a particular non-executable data resource of the subset of the set of non-executable data resources; and in response to the selection of the particular link to the particular non-executable data resource of the subset of the set of non-executable data resources, determine whether one of the plurality of native applications is associated with the particular non-executable data resource associated with the particular link, and when at least one of the plurality of native applications is associated with the particular non-executable data resource associated with the particular link, execute instructions for the at least one of the plurality of native applications to access the particular non-executable data resource associated with the particular link, and when none of the plurality of native applications is associated with the particular non-executable data resource associated with the particular link, execute the instructions for a native application simulator to access the particular non-executable data resource associated with the particular link, wherein the native application simulator intercepts specific input commands and translates the specific input commands to analogous commands of an application associated with the particular non-executable data resource.

21. The device of claim 20, wherein the device comprises the mobile device, and wherein the one or more processors are configured to send, via the network interface, a request for the information indicative of the subset of the set of non-executable data resources.

22. The device of claim 20, wherein the device comprises a remote computing device, and wherein the one or more processors are configured to send, via the network interface, the information indicative of the subset of the set of non-executable data resources.

23. A system comprising:
one or more processors;
a remote computing device configured to store, for each non-executable data resource of a set of non-executable data resources, data indicative of values associated with a user for one or more context dimensions, each context dimension identifying a circumstance of a previous access to a particular non-executable data resource stored on the remote computing device, each predetermined value being calculated based on one or more then-current values for the one or more context dimensions when the user previously accessed the particular non-executable data resource of the set of non-executable data resources; and a mobile device configured to:
determine scores for each of the one or more context dimensions based on the comparison, where the scores indicate how close the current values are to the predetermined values for each of the one or more context dimensions, including comparing a current time of day to a previous time of day when the particular non-executable data resource was previously accessed by the user;

obtain information indicative of the subset of the set of non-executable data resources that have a high probability of being accessed by the user by the mobile device based on a scores of current values for the one or more context dimensions to the predetermined values for the one or more context dimensions;

present, using the information, a user interface with a link to access each non-executable data resource of the subset of the set of non-executable data resources;

receive a selection of a particular link to a particular non-executable data resource of the subset of the set of non-executable data resources; and in response to the selection of the particular link to the particular non-executable data resource of the subset of the set of non-executable data resources, determine whether one of the plurality of native applications is associated with the particular non-executable data resource associated with the particular link, and when at least one of the plurality of native applications is associated with the particular non-executable data resource associated with the particular link, execute instructions for the at least one of the plurality of native applications to access the particular non-executable data resource associated with the particular link, and when none of the plurality of native applications is associated with the particular non-executable data resource associated with the particular link, execute the instructions for a native application simulator to access the particular non-executable data resource associated with the particular link, wherein the native application simulator intercepts specific input commands and translates the specific input commands to analogous commands of an application associated with the particular non-executable data resource.

24. The system of claim 23, wherein the remote computing device is configured to perform the comparison of the current values for the one or more context dimensions to the predetermined values for the one or more context dimensions, and wherein the remote computing device is configured to send the information indicative of the subset of the set of non-executable data resources that have the high probability of being accessed by the user to the mobile device.

25. The system of claim 23, wherein the mobile device is configured to perform the comparison of the current values for the one or more context dimensions to the predetermined values for the one or more context dimensions, and wherein the mobile device is configured to request the information indicative of the subset of the set of non-executable data resources that have the high probability of being accessed by the user from the remote computing device.

26. A non-transitory computer-readable storage medium comprising instructions that, when executed, cause a processor to:
- obtain for each non-executable data resource of a set of non-executable data resources stored on a remote computing device one or more predetermined values associated with a user for one or more context dimensions, each context dimension identifying a circumstance of a previous access to a particular non-executable data resource stored on the remote computing device, each predetermined value being calculated based on one or more then-current values for the one or more context dimensions when the user previously accessed the particular non-executable data resource of the set of non-executable data resources;
- determine, when the user is using a mobile device, current values for the one or more context dimensions;
- compare the current values for the one or more context dimensions to the predetermined values for the one or more context dimensions;
- determine scores for each of the one or more context dimensions based on the comparison, where the scores indicate how close the current values are to the predetermined values for each of the one or more context dimensions, including comparing a current time of day to a previous time of day when the particular non-executable data resource was previously accessed by the user;
- determine, based on the scores, a subset of the set of non-executable data resources that have a high probability of being accessed by the user;
- obtain by the mobile device information indicative of the subset of the set of non-executable data resources;
- present on the mobile device, using the information, a user interface with a link to access each non-executable data resource of the subset of the set of non-executable data resources;
- receive a selection of a particular link to a particular non-executable data resource of the subset of the set of non-executable data resources; and
- in response to the selection of the particular link to the particular non-executable data resource of the subset of the set of non-executable data resources, determine whether one of the plurality of native applications is associated with the particular non-executable data resource associated with the particular link, and when at least one of the plurality of native applications is associated with the particular non-executable data resource associated with the particular link, execute the instructions for the at least one of the plurality of native applications to access the particular non-executable data resource associated with the particular link, and when none of the plurality of native applications is associated with the particular non-executable data resource associated with the particular link, execute the instructions for a native application simulator to access the particular non-executable data resource associated with the particular link,
- wherein the native application simulator intercepts specific input commands and translates the specific input commands to analogous commands of an application associated with the particular non-executable data resource.

27. The computer-readable storage medium of claim 26, wherein the instructions that cause the processor to obtain by the mobile device the information indicative of the subset of the set of non-executable data resources comprise instructions that cause the processor to send the information indicative of the subset of the set of non-executable data resources from a remote computing device to the mobile device.

28. The computer-readable storage medium of claim 26, wherein the instructions that cause the processor to obtain by the mobile device the information indicative of the subset of the set of non-executable data resources comprise instructions that cause the processor to request the information indicative of the subset of the set of non-executable data resources from a remote computing device.

29. A mobile device comprising:
- a network interface configured to send and receive data via a network;
- a context determination unit configured to:
  - obtain for each non-executable data resource of a set of non-executable data resources stored on a remote computing device one or more predetermined values associated with a user for one or more context dimensions, each context dimension identifying a circumstance of a previous access to a particular non-executable data resource stored on the remote computing device, each predetermined value being calculated based on one or more then-current values for the one or more context dimensions when the user previously accessed the particular non-executable data resource of the set of non-executable data resources;
  - determine, when the user is using the mobile device, current values for the one or more context dimensions;
  - compare the current values for the one or more context dimensions to the predetermined values for the one or more context dimensions;
  - determine scores for each of the one or more context dimensions based on the comparison, where the scores indicate how close the current values are to the predetermined values for each of the one or more context dimensions, including comparing a current time of day to a previous time of day when the particular non-executable data resource was previously accessed by the user;
  - determine, based on the scores, a subset of the set of non-executable data resources that have a high probability of being accessed by the user;
- a data retrieval unit configured to obtain, via the network interface, information indicative of the subset of the set of non-executable data resources;
- a memory comprising instructions for a plurality of native applications and a native application simulator; and
- a processor configured to:
  - present, using the information, a user interface with a link to access each non-executable data resource of the subset of the set of non-executable data resources;
  - receive a selection of a particular link to a particular non-executable data resource of the subset of the set of non-executable data resources; and
  - in response to the selection of the particular link to the particular non-executable data resource of the subset of the set of non-executable data resources, determine whether one of the plurality of native applications is associated with the particular non-executable data resource associated with the particular link, and when at least one of the plurality of native applications is associated with the particular non-executable data resource associated with the particular link, execute the instructions for the at least one of the plurality of native applications to access the particular non-executable data resource associated with the particular link, and when none of the plurality of native applications is associated with the particular non-executable data resource associated with the particular link, execute the instructions for the native application simulator to access the particular non-executable data resource associated with the particular link, wherein the native application simulator intercepts specific input commands and translates the specific input commands to analogous commands of an application associated with the particular non-executable data resource.

* * * * *